United States Patent
Nagai et al.

(10) Patent No.: US 11,594,139 B2
(45) Date of Patent: Feb. 28, 2023

(54) MANAGEMENT SYSTEM, CONTROL METHOD THEREFOR, AND MANAGEMENT SERVER

(71) Applicant: HONDA MOTOR CO., LTD., Tokyo (JP)

(72) Inventors: Makoto Nagai, Wako (JP); Yo Ito, Tokyo (JP); Takahiro Iijima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/981,723

(22) PCT Filed: Mar. 19, 2019

(86) PCT No.: PCT/JP2019/011309
§ 371 (c)(1),
(2) Date: Sep. 17, 2020

(87) PCT Pub. No.: WO2019/181899
PCT Pub. Date: Sep. 26, 2019

(65) Prior Publication Data
US 2021/0248913 A1 Aug. 12, 2021

(30) Foreign Application Priority Data
Mar. 19, 2018 (JP) .............................. JP2018-051410

(51) Int. Cl.
*G08G 5/04* (2006.01)
*G08G 5/00* (2006.01)
(Continued)

(52) U.S. Cl.
CPC ........... *G08G 5/0039* (2013.01); *B64C 39/02* (2013.01); *B64C 39/024* (2013.01); *G05D 1/104* (2013.01);
(Continued)

(58) Field of Classification Search
CPC .... G08G 5/045; G08G 5/0008; G08G 5/0013; G08G 5/0026; G08G 5/0039;
(Continued)

(56) References Cited

U.S. PATENT DOCUMENTS 9,087,451 B1 * 7/2015 Jarrell ................. G08G 5/0091
9,547,986 B1   1/2017 Curlander et al.
(Continued)

FOREIGN PATENT DOCUMENTS

CN   105259916   1/2016
DE   102011119208  5/2013
(Continued)

OTHER PUBLICATIONS

International Search Report and Written Opinion for International Application No. PCT/JP2019/011309 dated Jun. 25, 2019, 12 pages.
(Continued)

*Primary Examiner* — Hunter B Lonsberry
*Assistant Examiner* — Matthew J. Reda
(74) *Attorney, Agent, or Firm* — Amin, Turocy & Watson, LLP

(57) ABSTRACT

A management system comprises a movement management unit that communicates via a communication device with a plurality of moving bodies including an autonomous moving body provided with an autonomous control unit for moving autonomously, and that manages the movement of the plurality of moving bodies. The movement management unit comprises a priority/subordination determination unit that determines the degree of priority/subordination relating to the respective movements of the plurality of moving bodies on the basis of individual information of the moving bodies. The autonomous moving body comprises: a priority/subordination comparison unit that compares another priority/subordination degree, which is a degree of priority/subor-
(Continued)

dination determined by the priority/subordination determination unit for another moving body that is a moving body, from among the plurality of moving bodies, different from the autonomous moving body, and the host priority/subordination degree, which is a degree of priority/subordination determined by the priority/subordination determination unit for the autonomous moving body; or a priority/subordination reception unit that receives the comparison results of the host priority/subordination degree and the other priority/subordination degree obtained by comparisons by the moving body management unit.

37 Claims, 15 Drawing Sheets

(51) Int. Cl.
  *G05D 1/10* (2006.01)
  *B64C 39/02* (2023.01)
  *G06F 16/2458* (2019.01)

(52) U.S. Cl.
  CPC ......... *G05D 1/106* (2019.05); *G06F 16/2471* (2019.01); *G08G 5/0008* (2013.01); *G08G 5/0013* (2013.01); *G08G 5/0026* (2013.01); *G08G 5/0069* (2013.01); *G08G 5/0082* (2013.01); *G08G 5/045* (2013.01); *B64C 2201/141* (2013.01); *G05B 2219/50391* (2013.01)

(58) Field of Classification Search
  CPC ........ G08G 5/0082; G05B 2219/50391; B64C 39/024; B64C 2201/141; G05D 1/106; G05D 1/104; G06F 16/2471
  See application file for complete search history.

(56) References Cited

U.S. PATENT DOCUMENTS

| | | |
|---|---|---|
| 9,997,080 B1 | 6/2018 | Chambers et al. |
| 2011/0125350 A1 | 5/2011 | Won et al. |
| 2013/0184980 A1 | 7/2013 | Ichikawa et al. |
| 2015/0339931 A1 | 11/2015 | Yu et al. |
| 2016/0117931 A1* | 4/2016 | Chan ..................... G08G 5/0034 701/120 |
| 2016/0124432 A1* | 5/2016 | Kawagoe ............... G08G 1/162 701/24 |
| 2016/0232796 A1* | 8/2016 | Oldach ................ G08G 5/0013 |
| 2017/0178505 A1* | 6/2017 | Ishikawa ................. G08G 1/09 |
| 2017/0276492 A1 | 9/2017 | Ramasamy |
| 2018/0068567 A1* | 3/2018 | Gong ................... G08G 5/0034 |
| 2018/0090013 A1* | 3/2018 | Park ...................... B64C 39/024 |
| 2018/0167131 A1* | 6/2018 | Liu ....................... B64C 39/024 |
| 2018/0213597 A1 | 7/2018 | Hayam |

FOREIGN PATENT DOCUMENTS

| | | |
|---|---|---|
| JP | 06-090218 | 3/1994 |
| JP | 2006-113687 | 4/2006 |
| JP | 2008-134744 | 6/2008 |
| JP | 5695979 | 4/2015 |
| JP | 2015-228152 | 12/2015 |
| JP | 2017-142659 | 8/2017 |
| JP | 2018-120570 | 8/2018 |
| WO | 2012/039280 | 3/2012 |

OTHER PUBLICATIONS

Extended European Search Report for European Patent Application No. 19770656.7 dated Nov. 16, 2021.
Chinese Office Action for Chinese Patent Application No. 201980020370.2 dated Mar. 1, 2022.
Non-Final Office Action for U.S. Appl. No. 16/766,813 dated Mar. 22, 2022.

* cited by examiner

FIG. 5

| | | MACHINE CLASSIFICATION | | |
|---|---|---|---|---|
| | | SECOND MACHINE CLASSIFICATION | FIRST MACHINE CLASSIFICATION | |
| | | FIRST TYPE | SECOND TYPE (GENERAL MACHINE CLASSIFICATION) | THIRD TYPE (EMERGENCY MACHINE CLASSIFICATION) |
| GEOGRAPHIC UNIT CLASSIFICATION | GEOGRAPHIC UNIT CLASSIFICATION A (DENSELY POPULATED REGIONS, DENSE RESIDENTIAL REGIONS) | FLIGHT PROHIBITED | FLIGHT PROHIBITED | CONDITIONALLY PERMITTED |
| | GEOGRAPHIC UNIT CLASSIFICATION B (ON ROADS, ON TRAIN LINES) | FLIGHT PROHIBITED | CONDITIONALLY PERMITTED | CONDITIONALLY PERMITTED |
| | GEOGRAPHIC UNIT CLASSIFICATION C (URBAN REGIONS) | FLIGHT PROHIBITED | CONDITIONALLY PERMITTED | FLIGHT PERMITTED |
| | GEOGRAPHIC UNIT CLASSIFICATION D (AGRICULTURAL FIELDS, RURAL REGIONS) | CONDITIONALLY PERMITTED | FLIGHT PERMITTED | FLIGHT PERMITTED |
| | GEOGRAPHIC UNIT CLASSIFICATION E (FREEWAYS, RIVERS, EVACUATION AREAS) | FLIGHT PERMITTED | FLIGHT PERMITTED | FLIGHT PERMITTED |

MANAGEMENT SYSTEM, CONTROL METHOD THEREFOR, AND MANAGEMENT SERVER

TECHNICAL FIELD

The present invention relates to a management system that manages movement of a moving body, a control method thereof, and a management server.

BACKGROUND ART

U.S. Patent Application Publication No. 2015/0339931 discloses a system, method, and apparatus enabling flight in response to flight-restricted regions (see the Abstract). In U.S. Patent Application Publication No. 2015/0339931, the position of an unmanned aerial vehicle (UAV) is compared to a flight-restricted region. If necessary, the UAV enacts measures to avoid intruding into a no-fly zone.

SUMMARY OF INVENTION

As described above, in U.S. Patent Application Publication No. 2015/0339931, the position of a UAV is compared to a flight-restricted region, and if necessary, the UAV enacts measures to avoid intruding into a no-fly zone (see the Abstract). However, U.S. Patent Application Publication No. 2015/0339931 does not consider the positional relationship between flying bodies. Such an issue is not limited to flying bodies, and also occurs with other autonomous moving bodies (ships, automobiles, and the like) that move autonomously.

The present invention has been devised in order to solve this type of problem, and has the object of providing a management system, a management system control method, and a management server for favorably setting the behavior of a moving body.

A management system according to one aspect of the present invention is a management system including a movement managing section that communicates via a communication apparatus with a plurality of moving bodies including an autonomous moving body having an autonomous control section configured to perform autonomous movement and manages movement of the plurality of moving bodies, wherein the movement managing section includes a priority/subordination determining section configured to determine a priority/subordination degree relating to the movement of each of the plurality of moving bodies, based on individual information of the plurality of moving bodies, and the autonomous moving body includes a priority/subordination comparing section configured to make a comparison between another priority/subordination degree, which is the priority/subordination degree determined by the priority/subordination determining section for another moving body that is different from the autonomous moving body among the plurality of moving bodies, and a self priority/subordination degree, which is the priority/subordination degree determined by the priority/subordination determining section for the autonomous moving body, or a priority/subordination receiving section configured to receive a comparison result between the other priority/subordination degree and the self priority/subordination degree acquired through a comparison made by the movement managing section.

According to the present invention, the autonomous moving body includes the priority/subordination comparing section that makes the comparison between the other priority/subordination degree and the self priority/subordination degree, or the priority/subordination receiving section that receives the comparison result between the other priority/subordination degree and the self priority/subordination degree. In this way, for example, it is possible to set the behavior of the autonomous moving body relative to the other moving body, based on the comparison result between the other priority/subordination degree and the autonomous priority/subordination degree. Accordingly, it is possible for the autonomous moving body to autonomously set its own actions (route selection and the like) without establishing communication with the other moving body. Therefore, even in a case where it is difficult to establish communication with the other moving body or a case where the flight route has shifted due to environmental factors such as the weather or birds, for example, it is possible to favorably set the actions of the moving body.

The autonomous moving body may control the autonomous control section based on the comparison result obtained through the comparison made by the priority/subordination comparing section.

The individual information may include machine information that is determined based on use application of the moving body.

The machine information may include a machine classification, and the use application of a moving body associated with a first machine classification among a plurality of the machine classifications is of a more public nature than the use application of a moving body associated with a second machine classification among the plurality of machine classifications.

The first machine classification may be divided into at least an emergency machine classification and a normal machine classification, and the use application of a moving body associated with the emergency machine classification may have a higher degree of urgency than the use application of a moving body associated with the normal machine classification.

The second machine classification may be divided into at least a commercial machine classification and a non-commercial machine classification, a moving body associated with the commercial machine classification may be used for a commercial purpose, and a moving body associated with the non-commercial machine classification may be used for a non-commercial purpose.

The priority/subordination determining section may determine, for a moving body for which the machine information indicates the first machine classification, a priority/subordination degree that is higher than the priority/subordination degree determined for a moving body for which the machine information indicates the second machine classification.

The individual information may include geographic information determined based on a geographic unit classification into which the moving body is permitted to enter.

The individual information may include passenger information determined based on presence or lack of a passenger on the moving body.

The priority/subordination determining section may determine, for a moving body for which the passenger information indicates the presence of a passenger, a priority/subordination degree that is higher than the priority/subordination degree determined for a moving body for which the passenger information indicates that there is no passenger.

The individual information may include loaded object information determined based on a value of a loaded object on the moving body.

The priority/subordination determining section may determine, for a moving body for which the loaded object information indicates a first value, a priority/subordination degree that is higher than the priority/subordination degree determined for a moving body for which the loaded object information indicates a second value that is less than the first value.

The individual information may include state information indicating a state of the moving body.

The state information may be movement velocity information indicating a movement velocity of the moving body, and the priority/subordination determining section may determine, for a moving body for which the movement velocity information indicates a first movement velocity, a priority/subordination degree that is lower than the priority/subordination degree determined for a moving body for which the movement velocity information indicates a second movement velocity that is less than the first movement velocity.

The state information may be movement altitude information indicating a movement altitude of the moving body, and the priority/subordination determining section may determine, for a moving body for which the movement altitude information indicates a first movement altitude, a priority/subordination degree that is lower than the priority/subordination degree determined for a moving body for which the movement altitude information indicates a second movement altitude that is less than the first movement altitude.

The state information may be remaining capacity information indicating a remaining capacity of a propulsion energy source of the moving body, and the priority/subordination determining section may determine, for a moving body for which the remaining capacity information indicates a first remaining capacity, a priority/subordination degree that is lower than the priority/subordination degree determined for a moving body for which the remaining capacity information indicates a second remaining capacity that is less than the first remaining capacity.

The state information may be movable distance information indicating a distance that the moving body is movable using a propulsion energy source, and the priority/subordination determining section may determine, for a moving body for which the movable distance information indicates a first movable distance, a priority/subordination degree that is lower than the priority/subordination degree determined for a moving body for which the movable distance information indicates a second movable distance that is shorter than the first movable distance.

The individual information may include capability information determined based on a capability of the moving body.

The capability information may be maximum velocity information determined based on a maximum velocity of the moving body, and the priority/subordination determining section may determine, for a moving body for which the maximum velocity information indicates a first maximum velocity, a priority/subordination degree that is lower than the priority/subordination degree determined for a moving body for which the maximum velocity information indicates a second maximum velocity that is less than the first maximum velocity.

The maximum velocity may be a maximum velocity in a vertical direction.

The capability information may be maximum output information determined based on a maximum output of a propulsion apparatus included in the moving body, and the priority/subordination determining section may determine, for a moving body for which the maximum output information indicates a first maximum output, a priority/subordination degree that is lower than the priority/subordination degree determined for a moving body for which the maximum output information indicates a second maximum output that is less than the first maximum output.

The autonomous moving body may further include a priority/subordination changing section configured to change the self priority/subordination degree determined by the priority/subordination determining section.

The priority/subordination changing section may change the self priority/subordination degree based on presence or lack of a passenger on the autonomous moving body.

The priority/subordination changing section may change the self priority/subordination degree based on a movement velocity of the autonomous moving body.

The priority/subordination changing section may change the self priority/subordination degree based on a movement altitude of the autonomous moving body.

The priority/subordination changing section may change the self priority/subordination degree based on a remaining capacity of a propulsion energy source of the autonomous moving body.

The priority/subordination changing section may change the self priority/subordination degree based on a distance that the autonomous moving body is movable using a propulsion energy source.

If the self priority/subordination degree and the other priority/subordination degree are equal and a timing at which the self priority/subordination degree was determined is earlier than a timing at which the other priority/subordination degree was determined, the priority/subordination changing section may change the self priority/subordination degree in a manner to become higher than the other priority/subordination degree.

The movement managing section may further include a priority/subordination adjusting section configured to adjust the priority/subordination degree when there are a plurality of moving bodies that have equal priority/subordination degrees.

When there are a plurality of moving bodies that have equal priority/subordination degrees, the priority/subordination adjusting section may adjust the priority/subordination degree of a moving body for which a timing at which the priority/subordination degree was determined is a first timing to become higher than the priority/subordination degree of a moving body for which a timing at which the priority/subordination degree was determined is a second timing that is later than the first timing.

The autonomous moving body may further include a receiving section configured to receive the priority/subordination degree determined by the priority/subordination determining section and a transmitting section configured to transmit the priority/subordination degree received by the receiving section.

The autonomous moving body may further include a request signal transmitting section configured to transmit a request signal for making a request to the other moving body for transmission of the priority/subordination degree of the other moving body.

The movement managing section may further include a monitoring section configured to check whether the autonomous moving body has received the priority/subordination degree. In this way, when dynamically changing the priority/subordination degree, it is possible to reliably perform the change of the priority/subordination degree.

When the other priority/subordination degree is higher than the self priority/subordination degree, the autonomous control section of the autonomous moving body sets a movement route of the autonomous moving body in a manner prioritizing the other moving body over the autonomous moving body. In this way, it is possible to prevent control interference among the plurality of moving bodies.

The plurality of moving bodies may be configured to broadcast the priority/subordination degrees using optical communication and radio communication. In this way, it is possible to realize redundancy in the information transmission between the autonomous moving body and the other moving body, thereby realizing reliable information transmission.

A management system control method according to another aspect of the present invention is a control method of a management system that manages a plurality of moving bodies including an autonomous moving body having an autonomous control section configured to perform autonomous movement, including a step of determining a priority/subordination degree relating to movement of each of the plurality of moving bodies, based on individual information of the plurality of moving bodies; and a step of making a comparison between another priority/subordination degree, which is the priority/subordination degree of another moving body that is different from the autonomous moving body among the plurality of moving bodies, and a self priority/subordination degree, which is the priority/subordination degree of the autonomous moving body, or a step of receiving a comparison result between the other priority/subordination degree and the self priority/subordination degree.

A management server according to yet another aspect of the present invention is a management server that communicates via a communication apparatus with a plurality of moving bodies including an autonomous moving body having an autonomous control section configured to perform autonomous movement and manages movement of the plurality of moving bodies, wherein the management server includes a priority/subordination determining section configured to determine a priority/subordination degree relating to the movement of each of the plurality of moving bodies, based on individual information of the plurality of moving bodies, and the autonomous moving body includes a priority/subordination comparing section configured to make a comparison between another priority/subordination degree, which is the priority/subordination degree determined by the priority/subordination determining section for another moving body that is different from the autonomous moving body among the plurality of moving bodies, and a self priority/subordination degree, which is the priority/subordination degree determined by the priority/subordination determining section for the autonomous moving body, or a priority/subordination receiving section configured to receive a comparison result between the other priority/subordination degree and the self priority/subordination degree acquired through a comparison made by the management server.

A management system according to yet another aspect of the present invention is a management system including a movement managing section that communicates via a communication apparatus with a plurality of moving bodies including an autonomous moving body having an autonomous control section configured to perform autonomous movement and manages movement of the plurality of moving bodies, wherein the movement managing section includes a priority/subordination determining section configured to determine a priority/subordination degree relating to the movement of each of the plurality of moving bodies, based on individual information of the plurality of moving bodies, and the autonomous moving body controls the autonomous control section based on another priority/subordination degree, which is the priority/subordination degree determined by the priority/subordination determining section for another moving body that is different from the autonomous moving body among the plurality of moving bodies, and a self priority/subordination degree, which is the priority/subordination degree determined by the priority/subordination determining section for the autonomous moving body.

A management system according to yet another aspect of the present invention is a management system including a movement managing section that communicates via a communication apparatus with a plurality of moving bodies including an autonomous moving body having an autonomous control section configured to perform autonomous movement and manages movement of the plurality of moving bodies, wherein the movement managing section includes a priority/subordination determining section configured to determine a priority/subordination degree relating to the movement of each of the plurality of moving bodies, based on individual information of the plurality of moving bodies, the movement managing section further includes a control content determining section configured to determine control content, based on the priority/subordination degree of another moving body that is different from the autonomous moving body among the plurality of moving bodies and the priority/subordination degree of the autonomous moving body, and the movement managing section transmits the control content determined by the control content determining section to the autonomous moving body.

According to the present invention, it is possible to favorably set behavior of a moving body.

BRIEF DESCRIPTION OF DRAWINGS

FIG. 5 shows an example of a relationship between machine classifications and geographic unit classifications of regions into which entry is permitted;

DESCRIPTION OF EMBODIMENTS

A. Embodiment

<A-1. Configuration>
[A-1-1. Overall Configuration]

Figure 1:
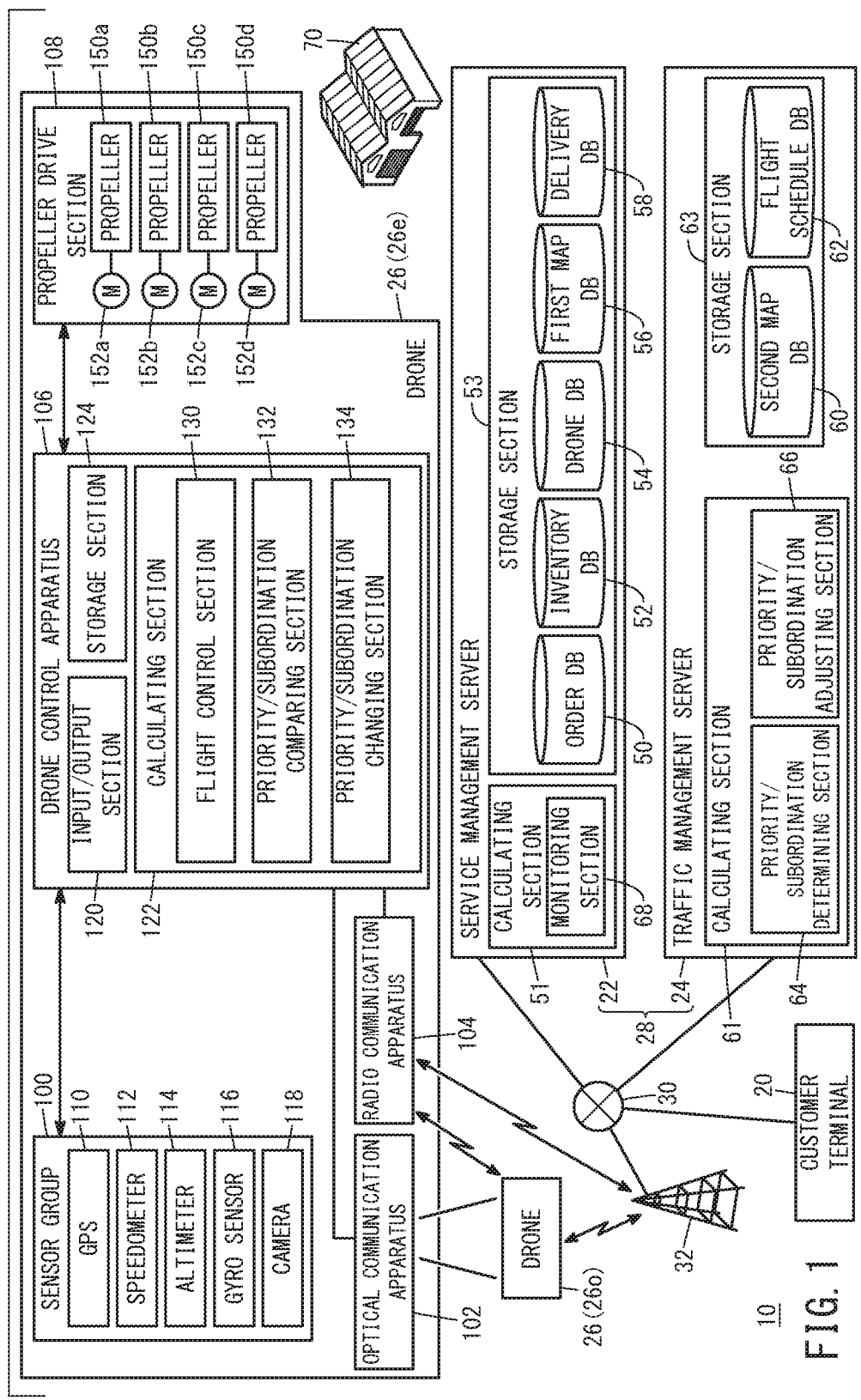
FIG. 1 shows an overall configuration of an outline of a management system according to an embodiment of the present invention.

FIG. 1 shows an overall configuration of an outline of a management system 10 according to an embodiment of the present invention. The management system 10 includes a plurality of customer terminals 20, at least one service management server 22 (also referred to below as a "service server 22"), at least one traffic management server 24 (also referred to below as a "traffic server 24"), and a plurality of drones (autonomous moving bodies or moving bodies) 26. The service server 22 and the traffic server 24 form a movement managing section 28. The movement managing section 28 communicates with the plurality of drones 26 via a communication apparatus (not shown in the drawings), and manages the movement of the plurality of drones 26. FIG. 1 shows only one customer terminal 20, one service server 22, and one traffic server 24. In the management system 10, a drone 26 delivers a product G based on product G order information input via the customer terminal 20.

Communication between the customer terminal 20 and the service server 22 and between the service server 22 and the traffic server 24 is possible via the Internet 30. Furthermore, communication between the service server 22 and the drones 26 is possible via the Internet 30 and a wireless relay station 32. Communication between the drones 26 is possible via optical communication and radio communication.

[A-1-2. Customer Terminal 20]

The customer terminal 20 is a terminal that receives an order from a customer for a product G handled by the service server 22. The customer terminal 20 is formed from a personal computer or a smartphone, for example.

[A-1-3. Service Management Server 22]

The service management server 22 performs order reception management, inventory management, and delivery management for a specified business. As shown in FIG. 1, the service management server 22 includes a calculating section 51 and a storage section 53. The calculating section 51 can include a central processing unit (CPU), a field-programmable gate array (FPGA), and the like. The calculating section 51 can operate by executing a program stored in the storage section 53. A portion of the functions executed by the calculating section 51 can be realized using a logic integrated circuit (IC). The calculating section 51 can form a portion of the above program with hardware (circuit components). The storage section 53 can store programs, data, and the like used by the calculating section 51. The storage section 53 can include a volatile memory (not shown in the drawings) and a nonvolatile memory (not shown in the drawings). The volatile memory can be a RAM (random access memory), for example. The volatile memory can be used as a register or the like, for example. The nonvolatile memory can be a ROM (read only memory), a flash memory, a hard disk drive, or the like, for example.

The storage section 53 includes an order database 50 (referred to below as an "order DB 50"), an inventory database 52 (referred to below as an "inventory DB 52"), a drone database 54 (referred to below as a "drone DB 54"), a first map database 56 (referred to below as a "first map DB 56"), and a delivery database 58 (referred to below as a "delivery DB 58").

The order DB 50 accumulates information (order information Io) concerning orders received via each customer terminal 20. The inventory DB 52 accumulates information (inventory information Is) concerning inventory. The drone DB 54 accumulates information (drone information Id) concerning drones 26 used for delivery.

The first map DB 56 accumulates map information (first map information Imap1) for performing delivery via the drones 26. The delivery DB 58 accumulates information (delivery information Idl) concerning delivery of a product G for which an order has been received. The delivery information Idl also includes information concerning the drone 26 that is to perform the delivery of the product G.

[A-1-4. Traffic Management Server 24]

The traffic management server 24 manages information (traffic information It) concerning traffic (flight) of the plurality of drones 26. For example, when a flight permission request for a drone 26 is received from the service server 22, the traffic server 24 judges whether to grant this flight permission request, and notifies the service server 22 that this request is granted or denied, according to the judgment result.

As shown in FIG. 1, the traffic management server 24 includes a calculating section 61 and a storage section 63. The calculating section 61 can include a central processing unit, an FPGA, and the like. The calculating section 61 can operate by executing a program stored in the storage section 63. A portion of the functions executed by the calculating section 61 can be realized using a logic IC. The calculating section 61 can form a portion of the above program with hardware. The storage section 63 can store programs, data, and the like used by the calculating section 61. The storage section 63 can include a volatile memory (not shown in the drawings) and a nonvolatile memory (not shown in the drawings). The volatile memory can be a RAM, for example. The volatile memory can be used as a register or the like, for example. The nonvolatile memory can be a ROM, a flash memory, a hard disk drive, or the like, for example.

The storage section 63 includes a second map database 60 (referred to below as a "second map DB 60") and a flight schedule database 62 (referred to below as a "flight schedule DB 62").

The second map DB 60 accumulates map information (second map information Imap2) concerning traffic (flight) of the drones 26. The flight schedule DB 62 accumulates information (flight schedule information Isc) concerning the flight schedule of each drone 26. The flight schedule information Isc also includes information concerning a priority/subordination degree (priority rank or priority level) R.

The priority/subordination degree R defines the order of priority among a drone itself 26 (also referred to below as a "host machine 26e") and another drone 26 (also referred to below as "another machine 26o"), when a plurality of drones 26 are near each other. In FIG. 1, the drone 26 in the upper portion is shown as the host machine 26e and the drone 26 in the lower portion is shown as the other machine 26o. In the present embodiment, the priority/subordination degree R is used by each of the host machine (drone) 26e and the other machine (drone) 26o to set a flight route RTf, but the priority/subordination degree R may also be used for other purposes such as described further below.

The movement managing section 28 includes a priority/subordination determining section 64. The priority/subordination determining section 64 can determine the priority/subordination degree R concerning the movement of each of a plurality of drones 26 based on individual information of the drones 26. The priority/subordination determining section 64 can be realized by executing a program stored in the storage section 63 with the calculating section 61. FIG. 1 shows a case in which the priority/subordination determining section 64 is included in the traffic server 24, but the present invention is not limited to this.

The individual information can include machine information determined based on use application of the plurality of drones 26. For example, the machine information can include a machine classification (classification). FIG. 5 shows an example of a relationship between machine classifications and classifications of geographical units into which entry is permitted.

As shown in FIG. 5, there can be a first type, a second type, and a third type of machine classification, for example, as the machine classification, but the present invention is not limited to this. There can be a geographical unit classification A, a geographical unit classification B, a geographical unit classification C, a geographical unit classification D, and a geographical unit classification E as the geographical unit classifications, but the present invention is not limited to this. The geographical unit classification A is for highly populated regions and dense residential regions, for example. The geographical unit classification B is for roads and train lines, for example. The geographical unit classification C is for urban regions, for example. The geographical unit classification D is for agricultural fields and rural regions, for example. The geographical unit classification E is for freeways, rivers, and evacuation areas.

As shown in FIG. 5, the first type of machine is prohibited from entering into regions with the geographical unit classifications A to C, for example. Furthermore, the first type of machine is conditionally permitted to enter into regions with the geographical unit classification D, for example. Yet further, the first type of machine is unconditionally permitted to enter into regions with the geographical unit classification E. The first type of machine can correspond to a machine for private use, for example. A machine used for commercial delivery, non-commercial delivery, commercial photography, non-commercial photography, and the like, for example, can correspond to the first type of machine.

The second type of machine is prohibited from entering into regions with the geographical unit classification A, for example. Furthermore, the second type of machine is conditionally permitted to enter into regions with the geographical unit classifications B and C, for example. Yet further, the second type of machine is unconditionally permitted to enter into regions with the geographical unit classifications D and E. The second type of machine can correspond to a machine for general public use, for example. A machine used for patrol surveillance by police and the like, for example, can correspond to the second type of machine.

The third type of machine is conditionally permitted to enter into regions with the geographical unit classifications A and B, for example. Furthermore, the third type of machine is unconditionally permitted to enter into regions with the geographical unit classifications C to E. The third type of machine can correspond to a machine for emergency public use, for example. A machine used for disaster response, lifesaving operations, crime response, and the like, for example, can correspond to the third type of machine.

The second type corresponds to a normal machine classification, for example, and the third type corresponds to an emergency machine classification, for example. The use application of a drone 26 associated with the third type, i.e. with the emergency machine classification, has a higher degree of urgency than the use application of a drone 26 associated with the second type, i.e. with the general machine classification.

The second type and third type are associated with a first machine classification (first classification), for example. The first type is associated with a second machine classification (second classification), for example. The use application of a drone 26 associated with the first machine classification is of a more public nature than the use application of a drone 26 associated with the second machine classification.

The second machine classification can be divided into at least a commercial machine classification (commercial classification) (not shown in the drawings) and a non-commercial machine classification (non-commercial classification) (not shown in the drawings). A drone 26 associated with the commercial machine classification can be used for commercial purposes. A drone 26 associated with the non-commercial machine classification can be used for non-commercial purposes.

The priority/subordination determining section 64 can determine, for a drone 26 for which the machine information concerning the machine classification indicates the first machine classification, a priority/subordination degree R that is higher than the priority/subordination degree R determined for a drone 26 for which the machine information concerning the machine classification indicates the second machine classification.

Here, a "high priority/subordination degree" means that the corresponding machine has priority over and is not subordinate to a machine with a relatively lower priority/subordination degree R. In other words, having a "high priority/subordination degree" means having a high degree of priority, i.e. a low degree of subordination. Furthermore, a "low priority/subordination degree" means that the corresponding machine is subordinate to and not prioritized over a machine with a relatively higher priority/subordination degree R. In other words, having a "low priority/subordination degree" means having a low degree of priority, i.e., a high degree of subordination.

The individual information can include geographic information based on the geographic unit classification of regions into which the drone 26 is permitted to enter, for example. Examples of the geographic unit classifications include the geographic unit classifications A to E such as described above using FIG. 5, but the present invention is not limited to this.

The individual information can include passenger information determined based on the presence or absence of a passenger in the drone 26, for example. The priority/subordination determining section 64 can determine, for a drone 26 for which the passenger information indicates that there is a passenger, a priority/subordination degree R that is higher than the priority/subordination degree R of a drone 26 for which the passenger information indicates that there is no passenger.

The individual information can include loaded object information determined based on the monetary value of an object loaded in the drone 26, for example. The priority/subordination determining section 64 can determine, for a drone 26 for which the loaded object information indicates a first monetary value, a priority/subordination degree R that is higher than the priority/subordination degree R of a drone 26 for which the loaded object information indicates a second monetary value that is lower than the first monetary value.

The individual information can include state information indicating a state of the drone 26, for example.

The state information is movement velocity information indicating movement velocity of the drone 26, for example. The priority/subordination determining section 64 can determine, for a drone 26 for which the movement velocity information indicates a first movement velocity, a priority/subordination degree R that is lower than the priority/subordination degree R of a drone 26 for which the movement velocity information indicates a second movement velocity that is lower than the first movement velocity.

The state information is movement altitude information indicating movement altitude of the drone 26, for example. The priority/subordination determining section 64 can determine, for a drone 26 for which the movement altitude information indicates a first movement altitude, a priority/subordination degree R that is lower than the priority/subordination degree R of a drone 26 for which the movement altitude information indicates a second movement altitude that is lower than the first movement altitude.

The state information is remaining capacity information indicating the remaining capacity of a propulsion energy source of the drone 26, for example. The priority/subordination determining section 64 can determine, for a drone 26 for which the remaining capacity information indicates a first remaining capacity, a priority/subordination degree R that is lower than the priority/subordination degree R of a drone 26 for which the remaining capacity information indicates a second remaining capacity that is lower than the first remaining capacity.

The state information is movable distance information indicating a distance that the drone 26 can move using the propulsion energy source, for example. The priority/subordination determining section 64 can determine, for a drone 26 for which the movable distance information indicates a first moveable distance, a priority/subordination degree R that is lower than the priority/subordination degree R of a drone 26 for which the moveable distance information indicates a second moveable distance that is shorter than the first moveable distance.

The individual information can include capability information determined based on the capability of the drone 26, for example.

The capability information is maximum velocity information indicating a maximum velocity of the drone 26, for example. The priority/subordination determining section 64 can determine, for a drone 26 for which the maximum velocity information indicates a first maximum velocity, a priority/subordination degree R that is lower than the priority/subordination degree R of a drone 26 for which the maximum velocity information indicates a second maximum velocity that is less than the first maximum velocity. This maximum velocity is the maximum velocity in a vertical direction, for example.

The capability information is maximum output information indicating the maximum output of a propeller drive section (propulsion apparatus) 108 included in the drone 26, for example. The priority/subordination determining section 64 can determine, for a drone 26 for which the maximum output information indicates a first maximum output, a priority/subordination degree R that is lower than the priority/subordination degree R of a drone 26 for which the maximum output information indicates a second maximum output that is lower than the first maximum output.

The movement managing section 28 further includes a priority/subordination adjusting section 66. In a case where there are a plurality of drones 26 for which the priority/subordination degrees R determined by the priority/subordination determining section 64 are the same, the priority/subordination adjusting section 66 can adjust the priority/subordination degrees R. The priority/subordination adjusting section 66 can be realized by a program stored in the storage section 63 being executed by the calculating section 61. FIG. 1 shows a case in which the priority/subordination adjusting section 66 is included in the traffic server 24, but the present invention is not limited to this.

In a case where there are a plurality of drones 26 for which the priority/subordination degrees R determined by the priority/subordination determining section 64 are the same, the priority/subordination adjusting section 66 can perform a process such as described below. Essentially, the priority/subordination adjusting section 66 can adjust the priority/subordination degrees R such that the priority/subordination degree R of a drone 26 for which the time at which the priority/subordination degree R was determined is a first time to be higher that the priority/subordination degree R of a drone 26 for which the time at which the priority/subordination degree R was determined is a second time that is later than the first time.

The movement managing section 28 further includes a monitoring section 68. The monitoring section 68 can check that a drone 26 has received a priority/subordination degree R. The monitoring section 68 can be realized by executing a program stored in the storage section 53 with the calculating section 51. FIG. 1 shows a case in which the monitoring section 68 is included in the service server 22, but the present invention is not limited to this.

[A-1-5. Drone 26]

(A-1-5-1. Outline of the Drone 26)

The drone 26 according to the present embodiment is used for product delivery, and delivers a product G from a warehouse 70 (FIG. 1) to a delivery destination Pdtar, according to a delivery command (flight command) received from the service server 22 via the Internet 30 and the wireless relay station 32. As described further below, the drone 26 may be used for other purposes.

As shown in FIG. 1, the drone 26 includes a sensor group 100, an optical communication apparatus 102, a radio communication apparatus 104, a drone control apparatus 106, and the propeller drive section 108. In FIG. 1, only the configuration of the drone 26 (26*e*) in the upper portion is shown in detail, but the drone 26 (26*o*) in the bottom portion has the same configuration.

(A-1-5-2. Sensor Group 100)

The sensor group 100 includes a global positioning system sensor 110 (referred to below as a "GPS sensor 110"), a speedometer 112, an altimeter 114, a gyro sensor 116, and a camera 118. The GPS sensor 110 detects the current position Pdcur of the drone 26. The speedometer 112 detects the flight velocity Vd [km/h] of the drone 26.

The altimeter 114 detects the ground altitude H (also referred to below as the "altitude H") [m] of the drone 26, which is the distance from the drone 26 to the surface of the ground therebelow. It is also possible to use the GPS sensor 110 as the altimeter 114. The gyro sensor 116 detects the angular velocity ω [rad/sec] of the drone 26. The angular velocity ω includes the angular velocity Y relative to the up-down axis (yaw Y), the angular velocity P relative to the left-right axis (pitch P), and the angular velocity Ro relative to the front-rear axis (roll Ro).

The camera 118 is arranged in a bottom portion of the body of the drone 26, and acquires an image Id of the drone 26 (also referred to below as a "drone image Id"). The camera 118 is a video camera that captures a moving image. Alternatively, the camera 118 may be capable of capturing both moving images and still images, or may be capable of capturing only still images. The orientation of the camera 118 of the present embodiment (posture of the camera 118 relative to the body of the drone 26) can be adjusted by a camera actuator (not shown in the drawings). Alternatively, the position of the camera 118 relative to the body of the drone 26 may be fixed.

(A-1-5-3. Optical Communication Apparatus 102 and Radio Communication Apparatus 104)

The optical communication apparatus 102 is capable of performing optical communication (first wireless communication) with the other machine 26o. Here, "optical" can include not only visible light, but also infrared light. The optical communication apparatus 102 includes an infrared ray radiating apparatus and an infrared ray receiving apparatus.

The radio communication apparatus 104 (communication apparatus) can perform radio communication (second wireless communication) with the wireless relay station 32, the other machine 26o, and the like. Here, "radio" can include millimeter waves, submillimeter waves, terahertz waves, centimeter waves, and the like. The radio communication apparatus 104 includes a radio communication module, for example. The radio communication apparatus 104 can communicate with the service server 22 and the like, via the wireless relay station 32 and the Internet 30.

The radio communication apparatus 104 can function as a receiving section (priority/subordination receiving section) that receives the priority/subordination degree R determined by the priority/subordination determining section 64. At least one of the radio communication apparatus 104 and the optical communication apparatus 102 can function as a transmitting section that transmits the priority/subordination degree R received by the receiving section. At least one of the radio communication apparatus 104 and the optical communication apparatus 102 can function as a request signal transmitting section that transmits a request signal for making a request to the other machine 26o for the transmission of the priority/subordination degree R of the other machine 26o.

(A-1-5-4. Drone Control Apparatus 106)

The drone control apparatus 106 controls all aspects of the drone 26, such as the flight, image capturing, and the like of the drone 26. As shown in FIG. 1, the drone control apparatus 106 includes an input/output section 120, a calculating section 122, and a storage section 124.

The calculating section 122 can include a central processing unit, an FPGA, and the like. The calculating section 122 can operate by executing a program stored in the storage section 124. A portion of the functions executed by the calculating section 122 can be realized using a logic IC. The program may be supplied from the service server 22 or the like, via the radio communication apparatus 104. The calculating section 122 can form a portion of the above program with hardware (circuit components). As shown in FIG. 1, the calculating section 122 includes a flight control section 130, a priority/subordination comparing section 132, and a priority/subordination changing section 134. The flight control section 130, the priority/subordination comparing section 132, and the priority/subordination changing section 134 can be realized by executing the program stored in the storage section 124 with the calculating section 122.

The flight control section (autonomous control section or control section) 130 performs flight control for controlling the flight of the drone 26. The flight control section 130 can cause the drone 26 to move autonomously.

The priority/subordination comparing section 132 compares another priority/subordination degree, which is the priority/subordination degree R of the other machine 26o, to a self priority/subordination degree, which is the priority/subordination degree R of the host machine 26e. The priority/subordination degree R of the other machine 26o may be transmitted from the other machine 26o, or may be transmitted from the movement managing section 28.

The priority/subordination changing section 134 can change the self priority/subordination degree determined by the priority/subordination determining section 64, in the following manner. The change of the priority/subordination degree R by the priority/subordination changing section 134 can be performed in a case where there is a possibility that the state information or the like has not been sufficiently considered by the priority/subordination determining section 64 due to a communication problem or the like, for example.

The priority/subordination changing section 134 can change the self priority/subordination degree based on the presence or absence of a passenger in the drone 26. If the passenger information of the host machine 26e indicates the presence of a passenger, for example, the priority/subordination changing section 134 may increase the self priority/subordination degree by a prescribed amount. If the passenger information of the host machine 26e indicates that there is no passenger, for example, the priority/subordination changing section 134 may decrease the self priority/subordination degree by a prescribed amount.

The priority/subordination changing section 134 can change the self priority/subordination degree based on the movement velocity of the drone 26. If the movement velocity of the host machine 26e is greater than or equal to a threshold value, for example, the priority/subordination changing section 134 may decrease the self priority/subordination degree by a prescribed amount. If the movement velocity of the host machine 26e is less than the threshold value, for example, the priority/subordination changing section 134 may increase the self priority/subordination degree by a prescribed amount.

The priority/subordination changing section 134 can change the self priority/subordination degree based on the movement altitude of the drone 26. If the movement altitude of the host machine 26e is greater than or equal to a threshold value, for example, the priority/subordination changing section 134 may decrease the self priority/subordination degree by a prescribed amount. If the movement altitude of the host machine 26e is less than the threshold value, for example, the priority/subordination changing section 134 may increase the self priority/subordination degree by a prescribed amount.

The priority/subordination changing section 134 can change the self priority/subordination degree based on the remaining capacity of the propulsion energy source of the drone 26. If the remaining capacity of the host machine 26e is greater than or equal to a threshold value, for example, the priority/subordination changing section 134 may decrease the self priority/subordination degree by a prescribed amount. If the remaining capacity of the host machine 26e is less than the threshold value, for example, the priority/ subordination changing section 134 may increase the self priority/subordination degree by a prescribed amount.

The priority/subordination changing section 134 can change the self priority/subordination degree based on the movable distance realized by the propulsion energy source of the drone 26. If the movable distance of the host machine 26*e* is greater than or equal to a threshold value, for example, the priority/subordination changing section 134 may decrease the self priority/subordination degree by a prescribed amount. If the movable distance of the host machine 26*e* is less than the threshold value, for example, the priority/subordination changing section 134 may increase the self priority/subordination degree by a prescribed amount.

If the priority/subordination degree and the other priority/subordination degree are the same and the time at which the self priority/subordination degree was determined is earlier than the time at which the other priority/subordination degree was determined, the priority/subordination changing section 134 can perform a process such as described below. Essentially, the priority/subordination changing section 134 can change the self priority/subordination degree to become higher than the other priority/subordination degree. If the priority/subordination degree and the other priority/subordination degree are the same and the time at which the self priority/subordination degree was determined is later than the time at which the other priority/subordination degree was determined, the priority/subordination changing section 134 can perform a process such as described below. Essentially, the priority/subordination changing section 134 can change the self priority/subordination degree to become lower than the other priority/subordination degree.

The storage section 124 stores the programs, data, and the like used by the calculating section 122. The storage section 124 can include a volatile memory (not shown in the drawings) and a nonvolatile memory (not shown in the drawings). The volatile memory can be a RAM, for example. The volatile memory can be used as a register or the like, for example. The nonvolatile memory can be a ROM, a flash memory, a hard disk drive, or the like, for example.

(A-1-5-5. Propeller Drive Section 108)

The propeller drive section 108 includes a plurality of propellers 150*a*, 150*b*, 150*c*, and 150*d* (referred to collectively below as "propellers 150") and a plurality of propeller actuators 152*a*, 152*b*, 152*c*, and 152*d* (referred to collectively below as "propeller actuators 152"). The propeller actuators 152 include electric motors, for example. In a case where these electric motors are AC motors, the propeller actuators 152 may include inverters that convert DC current into AC current. The number of propellers 150 (rotor blades) and propeller actuators 152 may be a number other than four.

<A-2. Control of the Present Embodiment>

[A-2-1. Outline up to Delivery Start]

Figure 2:
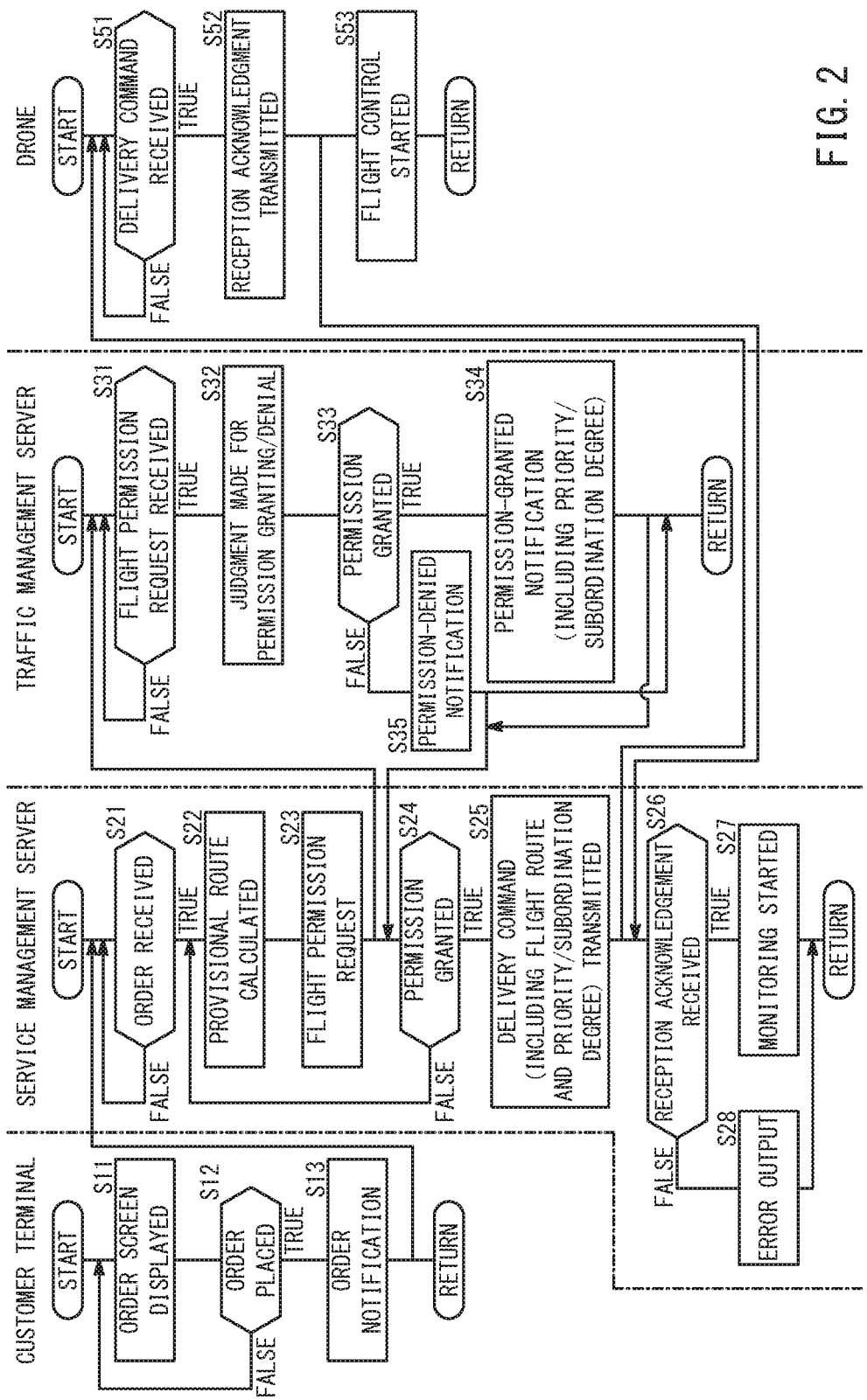
FIG. 2 is a flow chart showing an outline from when a customer makes an order to when the delivery of a product by the drone is started, in the present embodiment.

FIG. 2 is a flow chart showing an outline from when a customer makes an order to when the delivery of the product G by the drone 26 is started, in the present embodiment. It should be noted that FIG. 2 shows only the flow up to when the drone 26 starts the delivery (and does not show anything after the delivery is started).

At step S11, the customer terminal 20 displays an order screen in a display section (not shown in the drawings) in response to a manipulation made by the customer. The data in the order screen is acquired from the service server 22. When the order screen is displayed, the service server 22 checks the number of products G, which is the target of the order, that are in stock. If the product G is out of stock, the service server 22 displays this fact. If an order is placed (S12: TRUE), the process moves to step S13. If an order is not placed (S12: FALSE), the process returns to step S11. At step S13, the customer terminal 20 receives the order from the customer and transmits this order to the service server 22.

The processing then transitions to the service server 22. At step S21, the service server 22 monitors whether an order has been received from a customer via the customer terminal 20. If an order has been received (S21: TRUE), the process moves to step S22. If an order has not been received (S21: FALSE), step S21 is repeated.

At step S22, the service server 22 selects a drone 26 (also referred to below as a "target drone 26*tar*") to deliver the product G, from the drone DB 54. The service server 22 then calculates a scheduled route Rp (also referred to below as a "provisional route RTp") from the warehouse 70 to a delivery destination Pdtar (residence of the orderer or the like) and from the delivery destination Pdtar to a return destination Prtar (usually the warehouse 70), for the selected target drone 26*tar*.

The drone 26 selected as the target drone 26*tar* may be a drone that has completed a delivery and is currently returning. If the drone 26 is currently returning, the provisional route RTp can be set to be a route from the current position Pdcur of the target drone 26*tar* to a pickup destination Pp*tar*. Furthermore, the calculation of the target drone 26*tar* and the provisional route RTp may be performed before an order is placed, and confirmed when the order is placed.

At step S23, the service server 22 transmits the flight permission request for the provisional route RTp to the traffic server 24. The flight permission request also has an identification number of the target drone 26*tar* attached thereto. After the transmission of the flight permission request, at step S24, the service server 22 monitors whether a result notification has been received from the traffic server 24.

The processing then transitions to the traffic server 24. At step S31, the traffic server 24 judges whether a flight permission request has been received from the service server 22. If a flight permission request has been received (S31: TRUE), the process moves to step S32. If a flight permission request has not been received (S31: FALSE), step S31 is repeated.

At step S32, the traffic server 24 judges whether or not to grant the received flight permission request. For example, if the provisional route RTp includes a no-fly zone for the drone 26, the traffic server 24 does not grant the flight permission request. Furthermore, if one or more other drones 26*o* are scheduled to pass through a portion of the provisional route RTp at the same timing as the host machine 26*e*, the traffic server 24 does not grant the flight permission request. On the other hand, if there is no reason for not permitting the drone 26 to fly along the provisional route RTp, the traffic server 24 grants the flight permission request.

If the flight permission request is granted (S33: TRUE), at step S34, the traffic server 24 transmits a permission-granted notification. Prior to the transmission of the permission-granted notification, the traffic server 24 issues a priority/subordination degree R and includes this priority/subordination degree R in the permission-granted notification. In the manner described above, the priority/subordination degree R defines the priority order among the host machine 26*e* and the other machines 26*o* when the host machine 26*e* and the other machines 26*o* are near each other.

The traffic server 24 sets the priority/subordination degree R according to the machine classification of the drone 26. Here, the machine classification includes emergency uses, package delivery, advertising, security surveillance, surveying, entertainment uses, and personal hobbies, for example. Emergency uses include disaster response, lifesaving operations, and crime response, for example. Entertainment uses include music concerts and sporting events, for example. If overlapping flight routes RTf have been permitted for drones 26 with the same machine classification, the drone 26 that was granted permission earlier may be given a higher priority/subordination degree R. The priority/subordination degree R from the warehouse 70 to the delivery destination Pdtar and the priority/subordination degree R from the delivery destination Pdtar to the return destination Prtar may be set separately.

If the flight permission request is not granted (S33: FALSE), at step S35, the traffic server 24 transmits a permission-denied notification to the service server 22. The permission-denied notification also includes the reason for the denial or the like (e.g. that the provisional route RTp passes through a no-fly zone, the position of the no-fly zone, and the like).

The processing then transitions to the service server 22 again. If the result received from the traffic server 24 indicates that permission is granted (S24: TRUE), the process moves to step S25. If the result received from the traffic server 24 indicates that permission is denied (S24: FALSE), the process returns to step S22. The service server 22 then calculates a new provisional route RTp according to the reason for denial included in the result. For example, if the reason for denial is that the provisional route RTp passes through a no-fly zone, the service server 22 calculates a new provisional route RTp that avoids the no-fly zone (S22). The service server 22 then makes a flight permission request again (S23).

At step S25, the service server 22 transmits the delivery command (flight command) and the priority/subordination degree R to the target drone 26tar that is to deliver the product G. The delivery command includes a flight route RTf, which is the permitted provisional route RTp. The flight route RTf includes a route (outgoing route) from a departure point Pst that is the current position Pdcur (e.g. the warehouse 70) of the target drone 26tar to the delivery destination Pdtar and a route (return route) from the delivery destination Pdtar to the return destination Prtar.

If the target drone 26tar needs to stop at the warehouse 70 or the like for the delivery, the flight route RTf may include a route from the current position Pdcur to the warehouse 70 or the like. Alternatively, if the target drone 26tar needs to stop at the warehouse 70 or the like for the delivery, a route to the warehouse 70 or the like may be set as the flight route RTf. In such a case, a route to the delivery destination Pdtar and a route (return route) to the return destination Prtar may be set as the new flight route RTf. As described further below, instead of being transmitted directly from the service server 22 to the target drone 26tar, the delivery command can be transmitted by another method.

After the transmission of the delivery command, at step S26, the service server 22 judges whether a reception confirmation has been received from the target drone 26tar. If a reception confirmation has been received within a prescribed time (S26: TRUE), at step S27, the service server 22 starts monitoring the delivery (flight) of the target drone 26tar. The flight information If is received from the target drone 26tar at prescribed intervals. It should be noted that, in FIG. 2, a line corresponding to this point is omitted. If a reception confirmation has not been received within the prescribed time (S26: FALSE), at step S28, a prescribed error output is performed by the service server 22.

The processing then transitions to each drone 26. The drone 26 monitors whether a delivery command is received from the service server 22. If the delivery command is received (S51: TRUE), the process moves to step S52. If a delivery command is not received (S51: FALSE), step S51 is repeated.

At step S52, the drone 26 (target drone 26tar) transmits the reception confirmation to the service server 22. At the following step S53, the drone 26 (target drone 26tar) starts flight control to carry the product G from the warehouse 70 to the delivery destination Pdtar and return to the return destination Prtar. The flight control is described further below with reference to FIG. 3.

[A-2-2. Flight Control]
(A-2-2-1. Overall Flow of the Flight Control)

Figure 3:
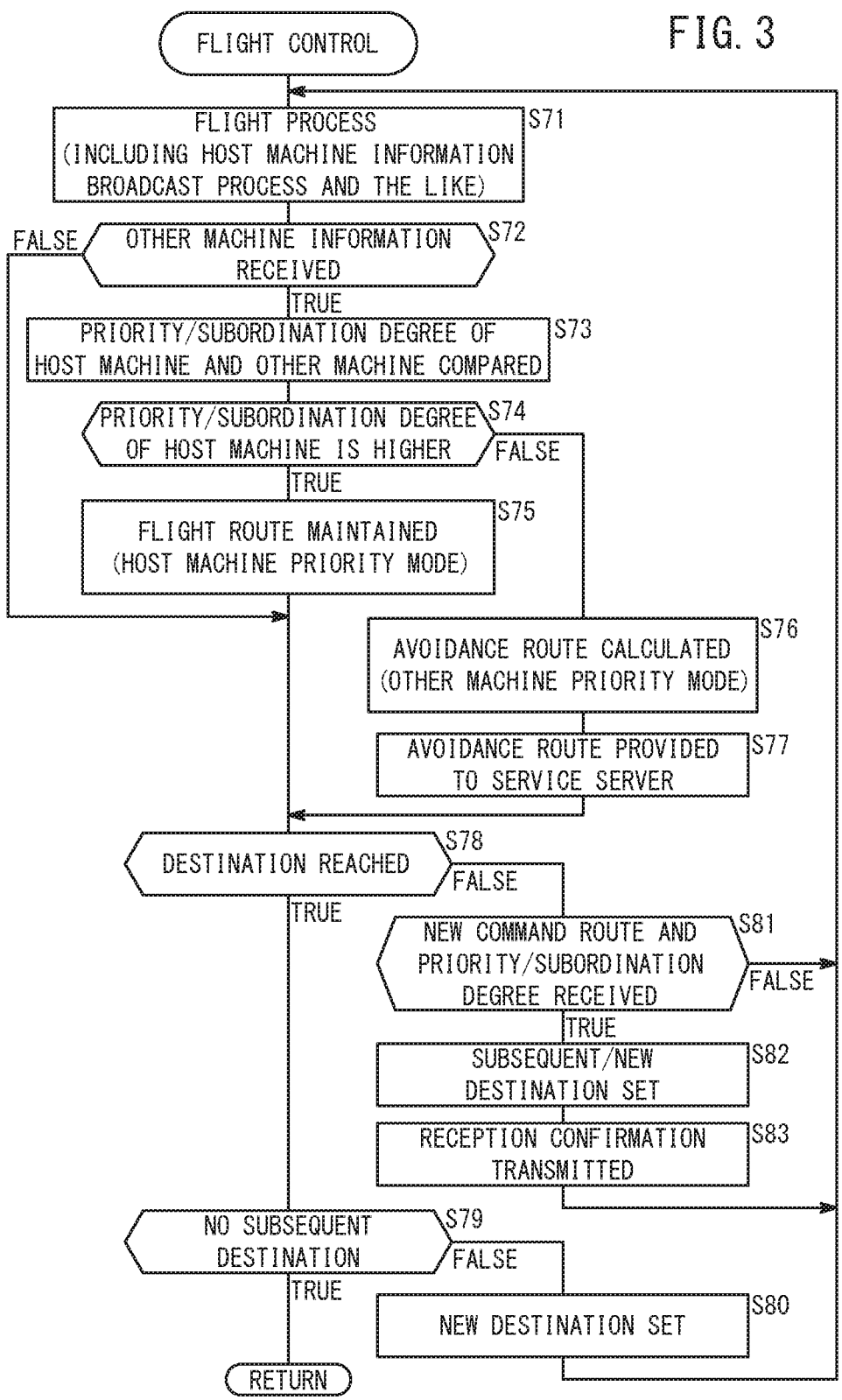
FIG. 3 is a flow chart showing an overall flow of flight control of the present embodiment.

FIG. 3 is a flow chart showing the overall flow of the flight control according to the present embodiment. As described above, the flight control is control for controlling the flight of the drone 26 (target drone 26tar), and is performed by the flight control section 130 of the drone control apparatus 106.

At step S71 of FIG. 3, the flight control section 130 performs a flight process that causes the drone 26 (target drone 26tar) to fly along the flight route RTf provided from the service server 22. The flight process includes a process for broadcasting host machine information Ied (referred to below as a "host machine information broadcast process") and a process for avoiding birds (referred to below as a "bird avoidance process"). The host machine information broadcast process and the bird avoidance process are described further below.

At step S72, the flight control section 130 judges whether other machine information Iod broadcast by another drone 26 (other machine 26o) has been received. The other machine information Iod is host machine information Ied from the point of view of the other machine 26o. The other machine information Iod includes the current position Podcur, an identification number IDo, and the priority/subordination degree R of the other machine 26o.

As described above, each drone 26 includes an optical communication apparatus 102 and a radio communication apparatus 104. If the other machine information Iod has been received via optical communication or wireless communication, the flight control section 130 judges that the other machine information Iod has been received. If the other machine information Iod has been received (S72: TRUE), the process moves to step S73. If the other machine information Iod has not been received (S72: FALSE), the process moves to step S78.

At step S73, the flight control section 130 compares the priority/subordination degree R of the other machine 26o, i.e. the other priority/subordination degree, that is included in the received other machine information Iod to the priority/subordination degree R of the host machine 26e, i.e. the self priority/subordination degree. If the priority/subordination degree R of the host machine 26e is higher than the priority/subordination degree R of the other machine 26o (S74: TRUE), at step S75, the flight control section 130 maintains the flight route RTf (host machine priority mode). If the priority/subordination degree R of the host machine 26e is not higher than the priority/subordination degree R of the other machine 26o (S74: FALSE), the process moves to step S76.

At step S76, the flight control section 130 calculates an avoidance route RTes for avoiding the other machine 26o (other machine priority mode). The avoidance route RTes is a route obtained by temporarily changing (detouring around) the flight route RTf in order to avoid the other machine 26o. The flight control section 130 then causes the host machine 26e to fly along a new flight route RTf that includes the avoidance route RTes.

If there are a plurality of other machines 26o to be avoided, the flight control section 130 changes the avoidance route RTes according to the priority/subordination degrees R. Specifically, the flight control section 130 sets the avoidance route RTes in the horizontal direction, the upward direction, and the downward direction according to the priority/subordination degrees R. For example, the flight route RTf for the drone 26 with the highest priority/subordination degree R (S75 of FIG. 3) is maintained. An avoidance route RTes in the horizontal direction is set for the drone 26 with the second highest priority/subordination degree R. An avoidance route RTes in the upward direction is set for the drone 26 with the third highest priority/subordination degree R. An avoidance route RTes in the downward direction is set for the drone 26 with the fourth highest priority/subordination degree R.

At step S77, the flight control section 130 notifies the service server 22 about the avoidance route RTes of the host machine 26e. The service server 22 monitors the flight of the drone 26 along the new flight route RTf including the received avoidance route RTes (see S27 of FIG. 2).

At S78 of FIG. 3, the flight control section 130 judges whether the host machine 26e has reached the destination Ptar. If the drone 26 has not reached the delivery destination Pdtar, the destination Ptar is the delivery destination Pdtar. Furthermore, if the delivery to the delivery destination Pdtar has been completed, the destination Ptar is the return destination Prtar (usually the warehouse 70). In the manner described further below, if another delivery command is received from the service server 22 during the return or the like, there are cases where another warehouse is set as the destination Ptar to which the drone 26 is to go to pick up a new product G. If the destination Ptar has been reached (S78: TRUE), the process moves to step S79.

At step S79, the flight control section 130 judges whether there are no subsequent destinations Ptarnext. If there drone 26 returns to the return destination Prtar and there are no subsequent destinations Ptarnext (S79: TRUE), the current flight control is finished. Furthermore, if the drone 26 reaches the destination Ptar that is a warehouse where a new product G is to be picked up and no subsequent destination Ptarnext is set (S79: TRUE), the drone 26 performs a process such as described below. Essentially, in such a case, after picking up the new product G, the drone 26 performs the delivery and the return along the new flight route RTf provided from the service server 22.

At step S79, if there is a subsequent destination Ptarnext (S79: FALSE), at step S80, the flight control section 130 sets the subsequent destination Ptarnext as the new destination Ptarnew. For example, when the delivery destination Pdtar has been reached, the return destination Prtar that is the subsequent destination Ptarnext is set as the new destination Ptar. Alternatively, if a pickup destination Pptar has been set while the drone 26 is heading toward the delivery destination Pdtar, the flight control section 130 sets the pickup destination Pptar as the subsequent destination Ptarnext after the delivery to the delivery destination Pdtar.

Returning to step S78, if the destination Ptar has not been reached (S78: FALSE), at step S81, the flight control section 130 judges whether the new flight route RTf and the priority/subordination degree R have been received from the service server 22. In order to distinguish the new flight route RTf from the current flight route RTf, the new flight route RTf is also referred to here as a command route Rtcom. If the new command route Rtcom and the priority/subordination degree R have been received (S81: TRUE), the process moves to step S82. If the new command route Rtcom or the priority/subordination degree R has not been received (S81: FALSE), the process returns to step S71.

At step S82, the flight control section 130 sets the destination Ptar (also referred to below as the "command destination Pcom") included in the new command route Rtcom as the subsequent destination Ptarnext or the new destination Ptar. At this time, if the drone 26 is heading toward the delivery destination Pdtar, the new command destination Pcom is set as the subsequent destination Ptarnext. Essentially, the command destination Pcom is used as the destination Ptar after the delivery destination Pdtar has been reached. Furthermore, if the drone 26 is heading toward the return destination Prtar, the new command destination Pcom is immediately set as the new destination Ptar. Accordingly, the flight route RTf of the drone 26 is immediately changed.

At step S83, the flight control section 130 transmits the new command destination Pcom reception confirmation to the service server 22. The service server 22 handles the reception confirmation from the drone 26 occurring in step S83 at step S26 of FIG. 2.

(A-2-2-2. Host Machine Information Broadcast Process)

Figure 4:
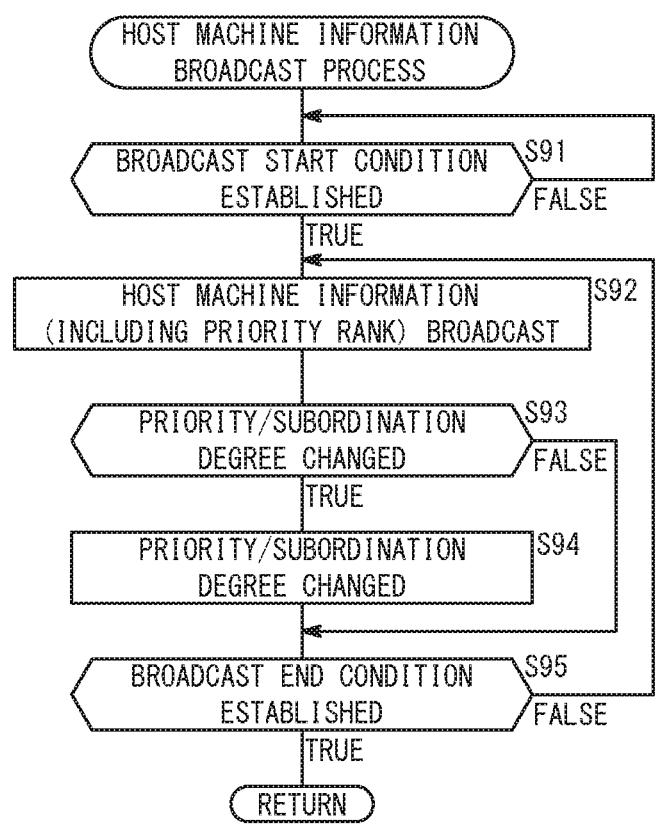
FIG. 4 is a flow chart of a host machine information broadcast process of the present embodiment.

FIG. 4 is a flow chart of the host machine information broadcast process of the present embodiment. As described above, the host machine information broadcast process is a process by which the drone 26 broadcasts the host machine information Ied, and is performed by the flight control section 130 as a portion of the flight process of step S71 of FIG. 3.

At step S91 of FIG. 4, the flight control section 130 judges whether a condition (broadcast start condition) for starting the broadcast of the host machine information Ied has been established. The drone 26 (target drone 26tar) starting to fly, for example, can be used as the broadcast start condition. Alternatively, another condition (e.g. that the altitude H has become greater than or equal to a first altitude threshold value THh1) may be used as the broadcast start condition. If a broadcast start condition has been established (S91: TRUE), the process moves to step S92. If a broadcast start condition has not been established (S91: FALSE), step S91 is repeated.

At step S92, the flight control section 130 broadcasts the host machine information Ied (including the priority/subordination degree R) in the vicinity of the host machine 26e. In the present embodiment, in order to ensure redundancy, the host machine information Ied is broadcast by both the optical communication apparatus 102 and the radio communication apparatus 104.

At step S93, the flight control section 130 judges whether the priority/subordination degree R is to be changed. For example, if the new flight command route Rtcom and the priority/subordination degree R are received at step S81 of FIG. 3 (S81: TRUE) and the route is to be changed immediately to a new flight route RTf, the flight control section 130 judges that the priority/subordination degree R is to be changed. Furthermore, if the drone 26 is to move to the pickup destination Pptar after reaching the delivery destination Pdtar, the flight control section 130 judges that the priority/subordination degree R is to be changed. On the other hand, if the new flight command route Rtcom and the priority/subordination degree R are received at step S81 of FIG. 3 (S81: TRUE) and the drone 26 is to fly toward the delivery destination Pdtar until the delivery is completed, a process such as described below is performed. Essentially, in such a case, the flight control section 130 judges that the priority/subordination degree R is not to be changed immediately, and is instead to be changed after the drone 26 reaches the delivery destination Pdtar.

If the priority/subordination degree R is to be changed (S93: TRUE), at step S94, the flight control section 130 changes the priority/subordination degree R. After step S94, or if the priority/subordination degree R is not to be changed (S93: FALSE), the process moves to step S95.

At step S95, the flight control section 130 judges whether a condition (broadcast end condition) for ending the broadcast of the host machine information Ied has been established. The drone 26 (target drone 26tar) having landed, for example, can be used as the broadcast end condition). Alternatively, another condition (e.g. that the altitude H has become less than or equal to a second altitude threshold value THh2) may be used as the broadcast end condition. The second altitude threshold value THh2 is set in a range that is greater than or equal to 0 and less than or equal to the first altitude threshold value THh1.

If a broadcast end condition has been established (S95: TRUE), the current host machine information broadcast process is ended. If a broadcast end condition has not been established (S95: FALSE), the process returns to step S92.
(A-2-2-3. Bird Avoidance Process)

The bird avoidance process is a process for avoiding a bird when a bird is present in the flight route RTf. This bird detection uses the image Id of the camera 118. When performing the bird avoidance process, the flight control section 130 provides notification to the service server 22. The service server 22 that has received this notification does not perform an error output even if the target drone 26tar temporarily deviates from the flight route RTf.
<A-3. Effects of the Present Embodiment>

According to the present embodiment, each of the plurality of drones 26 (autonomous moving body) broadcasts the priority/subordination degree R of the host machine 26e (S92 of FIG. 4). Then, when the priority/subordination degree R broadcast by another machine 26o is received (S72: TRUE of FIG. 3) is received, each drone 26 compares the priority/subordination degree R of the host machine 26e to the priority/subordination degree R of the other machine 26o (S73). The behavior of the host machine 26e relative to the other machine 26o is then set according to the comparison result (S74 to S77). In other words, each drone 26 controls the flight control section 130 based on the priority/subordination degree R of the host machine 26e and the priority/subordination degree R of the other machine 26o. In this way, each drone 26 can autonomously set its own behavior (flight route selection and the like) without establishing communication with the other machine 26o. Accordingly, in a case where it is difficult to establish communication between the host machine 26e and the other machine 26o, for example, or in a case where a drone 26 deviates from the flight route RTf due to environmental reasons such as weather or birds, it is possible to favorably set the mutual activities of a plurality of drones 26.

In the present embodiment, the plurality of drones 26 (autonomous moving bodies) each select a host machine priority mode that prioritizes the host machine 26e over the other machine 26o or another machine priority mode that prioritizes the other machine 26o over the host machine 26e, based on the result of a comparison between the priority/subordination degrees R (S75 and S76 of FIG. 3). A drone 26 that has selected the host machine priority mode sets the flight route RTf (movement route) of the host machine 26e while prioritizing the host machine 26e over the other machine 26o (S75). A drone 26 that has selected the other machine priority mode sets the flight route RTf of the host machine 26e while prioritizing the other machine 26o over the host machine 26e (S76). In this way, it is possible to prevent control interference by performing control based on rules that are shared by the plurality of drones 26.

In the present embodiment, the movement managing section 28 (service server 22 and traffic server 24) changes the priority/subordination degree R of the drone 26 (autonomous moving body) for each flight route RTf (movement route) (S22 to S25 and S31 to S34 of FIG. 2). Furthermore, if an updated priority/subordination degree R has been transmitted to the drone 26 (S25 of FIG. 2), the service server 22 monitors whether a reception confirmation has been received from the drone 26 (S26). In this way, in a case where the priority/subordination degree R is updated automatically, it is possible to reliably update the priority/subordination degree R.

In the present embodiment, the plurality of drones 26 (autonomous bodies) are configured to broadcast the priority/subordination degrees R using optical communication and radio communication (FIG. 1). In this way, it is possible to create redundancies for the transmission of information between the host machine 26e and the other machine 26o, and to realize reliable communication transmission.

B. Modifications

The present invention is not limited to the above-described embodiments, and it goes without saying that various configurations could be adopted based on the content described in the Specification. For example, the configurations described below can be adopted.
<B-1. Autonomous Moving Body>

The drone 26 of the embodiment described above is used for delivery (FIGS. 1 and 2). However, from the viewpoint of setting the behavior of the host machine 26e relative to the other machine 26o according to the comparison result of the priority/subordination degrees R, for example, the usage is not limited to this. For example, the drone 26 can also be used for emergency uses, advertising, security surveillance, surveying, entertainment, personal hobbies, and the like.

In the present embodiment, the present invention is applied to a drone 26 (FIGS. 1 and 2). However, from the viewpoint of setting the behavior of the host machine 26e relative to the other machine 26o according to the comparison result of the priority/subordination degrees R, for example, the present invention may be applied to a different type of flying body or may be applied to an autonomous moving body other than a flying body. For example, the present invention can be applied to a helicopter, a ship, or an automated driving vehicle instead of a drone 26.

The drone 26 of the embodiment described above flies according to a delivery command (flight command) from the service server 22 (FIG. 2). However, from the viewpoint of setting the behavior of the host machine 26e relative to the other machine 26o according to the comparison result of the priority/subordination degrees R, for example, the present invention is not limited to this.
<B-2. Communication Apparatus>]

In the embodiment described above, the optical communication apparatus 102 and the radio communication apparatus 104 are provided as the communication apparatus (FIG. 1). However, from the viewpoint of performing wireless communication directly or indirectly between the host machine 26e and the other machine 26o, for example, the present invention is not limited to this. For example, it is acceptable to provide only one of the optical communication apparatus 102 and the radio communication apparatus 104. Alternatively, it is possible to provide two radio communication apparatuses 104 and optical communication apparatuses 102 using different frequency bands.

<B-3. Rotor Blade>

In the embodiment described above, a rotor blade that generates lift is used as the propeller 150 (FIG. 1). However, from the viewpoint of generating lift, for example, it is possible to use another rotor blade (e.g. a rotor for a helicopter). Furthermore, it is possible to apply the present invention to a flying body that flies without using a rotor blade (e.g. a machine performing vertical take-off and landing (VTOL)).

<B-4. Movement Management Section 28>

The movement managing section 28 of the embodiment described above includes the service server 22 and the traffic server 24 (FIG. 1). However, from the viewpoint of managing the movement of the plurality of drones 26 (or autonomous moving bodies), the present invention is not limited to this. For example, it is acceptable for the movement managing section 28 to be formed by only the service server 22. Alternatively, a plurality of local management control servers that manage the flight of the drones 26 can be provided in prescribed regions, in addition to the service server 22 and the traffic server 24. The delivery commands may be transmitted from the service server 22 to the drones 26 via these local management control servers.

<B-5. Flight Control>

In the flight control of the embodiment described above, each flight control section 130 broadcasts the host machine information Ied without specifying another machine 26o (S71 of FIG. 3). However, from the viewpoint of transmitting the host machine information Ied to another machine 26o, for example, the present invention is not limited to this. For example, each flight control section 130 may identify another machine 26o that is to receive the host machine information Ied (e.g. give another machine 26o identification information), and then transmit the host machine information Ied.

In the flight control of the embodiment described above, if the priority/subordination degree R of the host machine 26e is higher than the priority/subordination degree R of the other machine 26o (S74: TRUE of FIG. 3), the host machine 26e maintains the flight route RTf (S75). However, from the viewpoint of setting the behavior of the host machine 26e relative to the other machine 26o according to the result of the comparison of the priority/subordination degrees R, the present invention is not limited to this. If the priority/subordination degree R of the host machine 26e is higher than the priority/subordination degree R of the other machine 26o, for example, it is possible to decrease the avoidance amount of the host machine 26e and increase the avoidance amount of the other machine 26o.

In the flight control of the embodiment described above, the change of the flight route RTf is set according to the result of the comparison between the priority/subordination degrees R of the host machine 26e and the other machine 26o (S75 and S76 of FIG. 3). However, from the viewpoint of setting the behavior of the host machine 26e relative to the other machine 26o according to the comparison result of the priority/subordination degrees R, for example, the present invention is not limited to this. For example, it is possible to perform an adjustment to accelerate or decelerate the host machine 26e or the other machine 26o according to the comparison result of the priority/subordination degrees R. For example, if the priority/subordination degree R of the host machine 26e is higher than the priority/subordination degree R of the other machine 26o and the flight routes RTf of these machines are not parallel, the host machine 26e can maintain or increase its flight velocity Vd and the other machine 26o can decelerate.

In the embodiment described above, the description assumes that the priority/subordination degrees R of the host machine 26e and the other machine 26o do not become the same (see S74 of FIG. 3), but the present invention is not limited to this, and a configuration in which the priority/subordination degrees R of the host machine 26e and the other machine 26o become the same is also possible. In such a case, for example, the host machine 26e and the other machine 26o may communicate wirelessly and a determination about which of the host machine 26e and the other machine 26o is to be prioritized may be made according to a prescribed rule, that is, a predetermined determination axis (judgment axis or evaluation axis) for the priority/subordination degree.

This prescribed rule can be a trilemma relationship or the like, for example. A trilemma relationship is a relationship among three items whereby each item has benefits against one of the other items and drawbacks against the remaining other item, thereby resulting in a relationship in which all three are stuck. In other words, a trilemma relationship is a relationship in which choice S is better than choice T, choice T is better than choice U, and choice U is better than choice S. Specifically, this prescribed rule can be used to play rock-paper-scissors between the host machine 26e and the other machine 26o. In rock-paper-scissors, "paper" beats "rock", "rock" beats "scissors", and "scissors" beats paper. The host machine 26e and the other machine 26o each select one of "paper", "rock", and "scissors", and communicate the choice to each other at the same timing. The drone 26 that wins is given priority. The example of a trilemma described above is merely an example, and the present invention is not limited to this. For example, a similar choice among four items, five items, or the like may be used.

Figure 6:
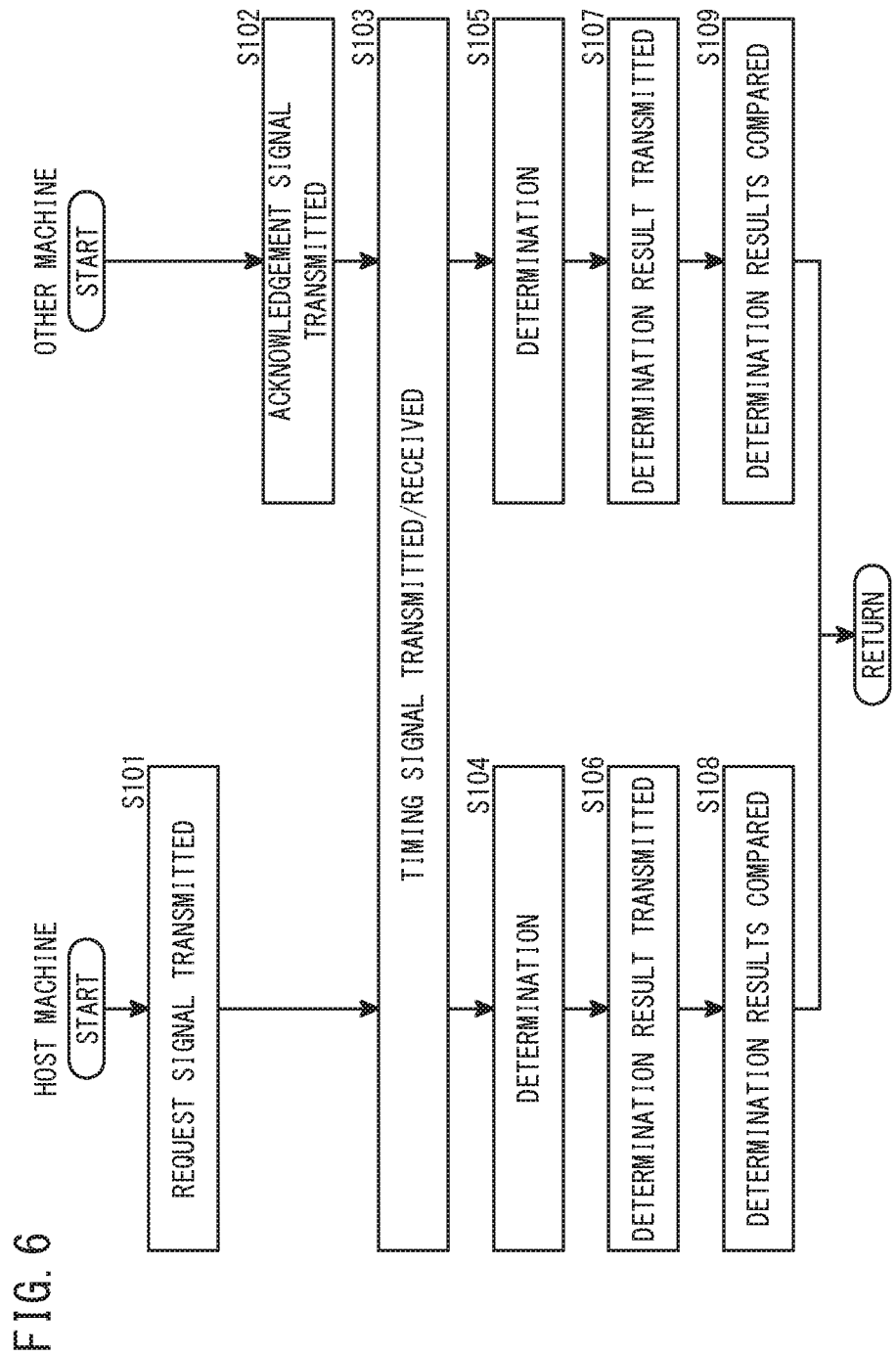
FIG. 6 is a flow chart showing an example of an operation in a case where the priority/subordination degrees are the same.

FIG. 6 is a flow chart showing an example of an operation in a case where priority/subordination degrees are the same. The process shown in FIG. 6 can be performed in a case where, at step S73 of FIG. 3, the priority/subordination degree R of the host machine 26e and the priority/subordination degree R of the other machine 26o are the same, for example.

At step S101, the host machine 26e transmits to the other machine 26o a request signal for requesting a determination of the priority/subordination among the host machine 26e and the other machine 26o based on the prescribed rule. This request signal can include information indicating what rule the determination of the priority/subordination among the host machine 26e and the other machine 26o is to be based on. Here, an example is described of a case in which the priority/subordination among the host machine 26e and the other machine 26o is determined by having the host machine 26e and the other machine 26o make a selection from among choices having a trilemma relationship. The first choice, the second choice, and the third choice in the trilemma relationship have a relationship such as described below. The first choice has a higher priority/subordination degree than the second choice. The second choice has a higher priority/subordination degree than the third choice. The third choice has a higher priority/subordination degree than the first choice. After this, the process moves to step S102.

At step S102, the other machine 26o transmits to the host machine 26e an acknowledgment signal indicating consent to perform prioritization/subordination among the host machine 26e and the other machine 26o based on the predetermined rule. After this the process moves to step S103.

At step S103, the host machine 26e and the other machine 26o transmit and receive timing signals for synchronizing the timing. The timing signal is emitted from at least one of the host machine 26e and the other machine 26o. The transmission and reception of the timing signal can be performed continuously, for example, but the present invention is not limited to this. After this, the process moves to steps S104 and S105.

At step S104, the host machine 26e selects one of the plurality of choices in the trilemma relationship. In this way, a first determination value is determined. The first determination value in the example shown in FIG. 6 is a choice selected by the host machine 26e from among the plurality of choices in the trilemma operation. The first determination value is a value determined by the flight control section 130 included in the host machine 26e, for example. At step S105, the other machine 26o selects one of the plurality of choices in the trilemma relationship. In this way, a second determination value is determined. The second determination value in the example shown in FIG. 6 is a choice selected by the other machine 26o from among the plurality of choices in the trilemma operation. The second determination value is a value determined by the flight control section 130 included in the other machine 26o, for example. Step S104 and step S105 do not need to be performed at the same timing. After this, the process moves to steps S106 and S107.

At step S106, the host machine 26e transmits to the other machine 26o a signal indicating the first determination value determined at step S104. In other words, the host machine 26e transmits to the other machine 26o information indicating the choice selected at step S104. At step S107, the other machine 26o transmits to the host machine 26e a signal indicating the second determination value determined at step S105. In other words, the other machine 26o transmits to the host machine 26e information indicating the choice selected at step S105. Steps S106 and S107 are preferably performed simultaneously at a prescribed timing, based on the timing signal described above. This is because, if the timing at which step S106 is performed is earlier than the timing at which step S107 is performed, it is possible for the other machine 26o to determine a second determination value that beats the first determination value transmitted from the host machine 26e to the other machine 26o, which would not be fair. Furthermore, if the timing at which step S107 is performed is performed is earlier than the timing at which step S106 is performed, it is possible for the host machine 26e to determine a first determination value that beats the second determination value transmitted from the other machine 26o to the host machine 26e, which would not be fair. After this, the process moves to step S108 and S109.

At step S108, the host machine 26e judges the priority/subordination among the host machine 26e and the other machine 26o, by comparing the first determination value determined by the host machine 26e and the second determination value determined by the other machine 26o. Such a judgment can be performed by the flight control section 130 included in the host machine 26e, for example.

At step S109, the other machine 26o judges the priority/subordination among the other machine 26o and the host machine 26e, by comparing the second determination value determined by the other machine 26o and the first determination value determined by the host machine 26e. Such a judgment can be performed by the flight control section 130 included in the other machine 26o, for example. Step S108 and step S109 do not need to be performed at the same timing.

In this way, the priority/subordination among the host machine 26e and the other machine 26o can be determined based on the prescribed rule. In a case where the choice selected by the host machine 26e is the same as the choice selected by the other machine 26o, steps S104 to S109 are repeated. In other words, steps S104 to S109 are repeated if the first determination value determined by the host machine 26e and the second determination value determined by the other machine 26o are the same. After this, the process moves to step S74 shown in FIG. 3. In this way, the flight control section 130 is controlled based on the priority/subordination relationship between the first determination value determined by the host machine 26e and the second determination value determined by the other machine 26o.

According to such a configuration, even in a case where the host machine 26e and the other machine 26o have the same priority/subordination degrees R, it is possible to favorably determine the priority/subordination among the host machine 26e and the other machine 26o.

Here, an example is described of a case in which the process such as described above is performed when the priority/subordination degree R of the host machine 26e determined by the priority/subordination determining section 64 and the priority/subordination degree R determined by the other machine 26o of the priority/subordination determining section 64 are the same, but the present invention is not limited to this. For example, the process such as described above may be performed in a configuration where the priority/subordination degree R of the host machine 26e and the priority/subordination degree R of the other machine 26o are not determined by the priority/subordination determining section 64.

Figure 7:
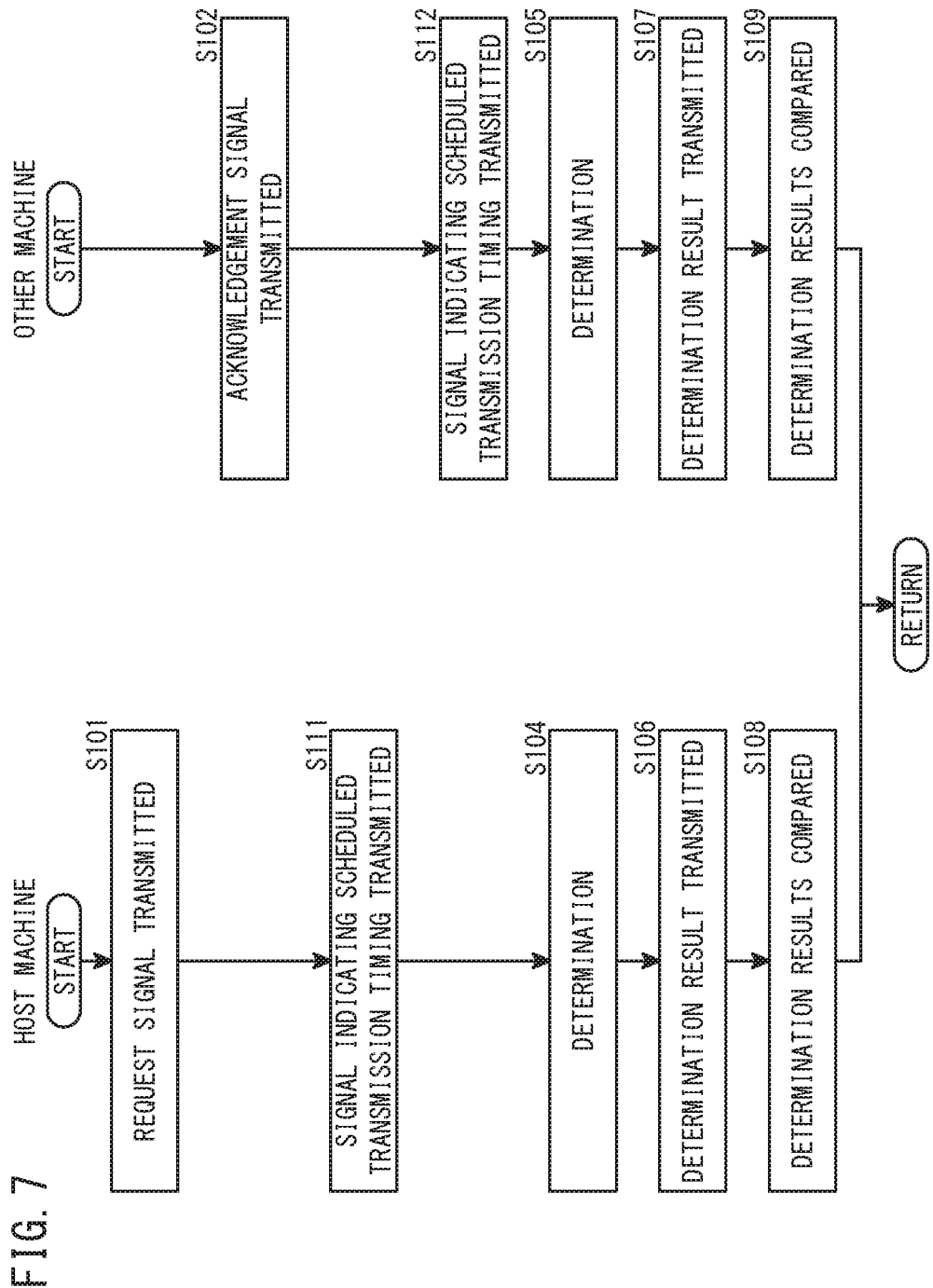
FIG. 7 is a flow chart showing an example of an operation in a case where the priority/subordination degrees are the same.

FIG. 7 is a flow chart showing another example of a case in which the priority/subordination degrees are the same. The process shown in FIG. 7 can be performed in a case where, at step S73 of FIG. 3, the priority/subordination degree R of the host machine 26e and the priority/subordination degree R of the other machine 26o are the same, for example.

Steps S101 and S102 are the same as steps S101 and S102 described above using FIG. 6, and therefore descriptions thereof are omitted.

At step S111, the host machine 26e transmits to the other machine 26o a signal proposing a scheduled transmission timing, which is a timing at which the transmission of the determination result is scheduled to be performed. Essentially, the host machine 26e transmits to the other machine 26o scheduled transmission timing information indicating this scheduled transmission timing. After this, the process moves to step S112.

At step S112, the other machine 26o transmits to the host machine 26e a signal acknowledging the scheduled transmission timing proposed from the host machine 26e. After this, the process moves to steps S104 and S105.

Here, an example is described of a case in which the scheduled transmission timing information is transmitted from the host machine 26e to the other machine 26o, but the present invention is not limited to this. The scheduled transmission timing information may be transferred from the other machine 26o to the host machine 26e. In such a case, the signal indicating acknowledgement of the scheduled transmission timing proposed from the other machine 26o is transmitted from the host machine 26e to the other machine 26o.

Steps S104 to S109 are the same as steps S104 to S109 described above using FIG. 6, and therefore descriptions thereof are omitted.

In this way, the priority/subordination among the host machine 26e and the other machine 26o is determined based on the prescribed rule. In a case where the first determination value determined by the host machine 26e and the second determination value determined by the other machine 26o are the same, steps S104 to S109 are repeated. After this, the process moves to step S74 shown in FIG. 3.

In this way, the first determination value determined by the host machine 26e and the second determination value determined by the other machine 26o may both be transmitted at the timing based on the scheduled transmission timing information.

Here, an example is described of a case in which the process such as described above is performed when the priority/subordination degree R of the host machine 26e determined by the priority/subordination determining section 64 and the priority/subordination degree R of the other machine 26o determined by the priority/subordination determining section 64 are the same, but the present invention is not limited to this. For example, the process such as described above may be performed in a configuration where the priority/subordination degree R of the host machine 26e and the priority/subordination degree R of the other machine 26o are not determined by the priority/subordination determining section 64.

Figure 8:
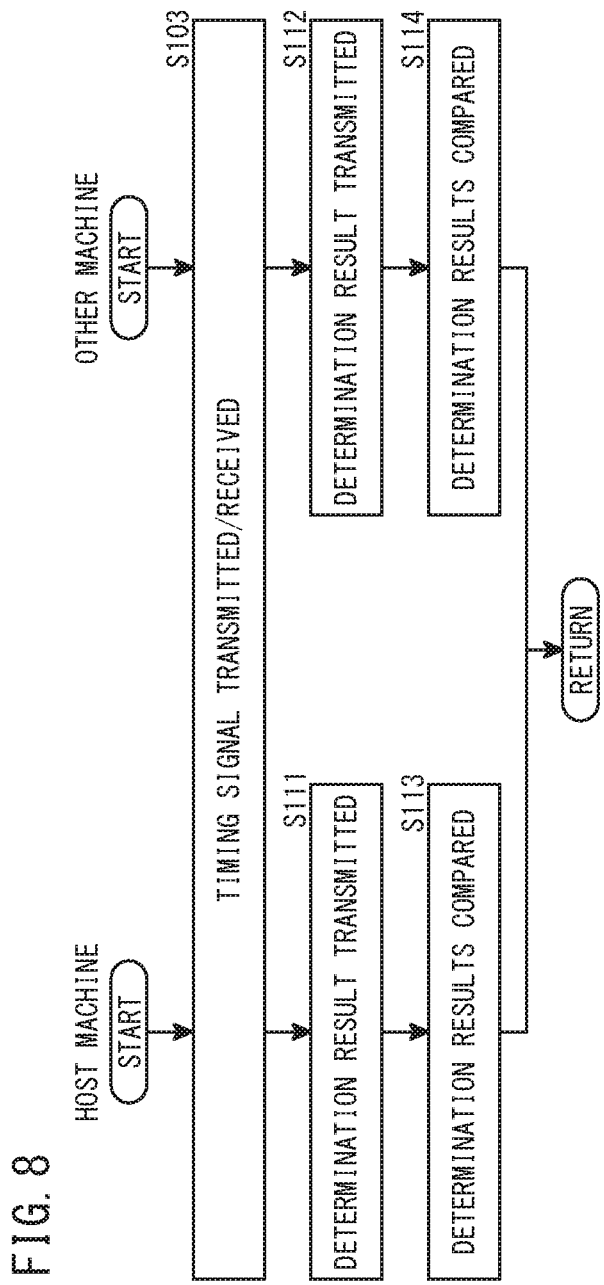
FIG. 8 is a flow chart showing an example of an operation in a case where the priority/subordination degrees are the same.

In the example shown in FIGS. 6 and 7, an example is described of a case in which the transmission of the request signal (step S101) and the transmission of the acknowledgement signal (step S102) are performed, but the present invention is not limited to this. In a case where the priority/subordination degree R of the host machine 26e and the priority/subordination degree R of the other machine 26o are the same, a process such as described below can be performed if the rule to be used to determine the priority/subordination among the host machine 26e and the other machine 26o is set in advance. FIG. 8 is a flow chart showing an example of an operation in a case where the priority/subordination degrees are equal. FIG. 8 shows an example of a case in which the rule to be used to determine the priority/subordination among the host machine 26e and the other machine 26o, if the priority/subordination degree R of the host machine 26e and the priority/subordination degree R of the other machine 26o are equal, is set in advance. FIG. 8 shows an example of a case in which it is set in advance that the priority/subordination among the host machine 26e and the other machine 26o is to be determined using state information if the priority/subordination degree R of the host machine 26e and the priority/subordination degree R of the other machine 26o are equal. In other words, in the example shown in FIG. 8, the state information of the host machine 26e is set to the first determination value and the state information of the other machine 26o is set to the second determination value. Here, an example is described of a case in which the remaining capacity of the propulsion energy source of the other machine 26 is used as the state information, but the present invention is not limited to this. The process shown in FIG. 8 can be performed in a case where, at step S73 of FIG. 3, the priority/subordination degree R of the host machine 26e and the priority/subordination degree R of the other machine 26o are the same, for example.

As shown in FIG. 8, step S103 is performed but steps S101 and S102 are not performed. Step S103 is the same as step S103 described above using FIG. 6, and therefore a description thereof is omitted. After this, the process moves to steps S111 and S112.

At step S111, the host machine 26e transmits the first determination value to the other machine 26o. For example, the state information concerning the host machine 26e is set to the first determination value. Here, an example is described of a case in which the state information transmitted from the host machine 26e to the other machine 26o is the remaining capacity information indicating the remaining capacity of the propulsion energy source of the host machine 26e, but the present invention is not limited to this. At step S112, the other machine 26o transmits the second determination value to the host machine 26e. For example, the state information concerning the other machine 26o is set to the second determination value. Here, an example is described of a case in which the state information transmitted from the other machine 26o to the host machine 26e is the remaining capacity information indicating the remaining capacity of the propulsion energy source of the other machine 26o, but the present invention is not limited to this. After this, the process moves to steps S113 and S114.

At step S113, the host machine 26e recognizes the priority/subordination among the host machine 26e and the other machine 26o by comparing the first determination value and the second determination value. In other words, the host machine 26e recognizes the priority/subordination among the host machine 26e and the other machine 26o by comparing the state information concerning the host machine 26e and the state information concerning the other machine 26o.

At step S114, the other machine 26o recognizes the priority/subordination among the other machine 26o and the host machine 26e by comparing the first determination value and the second determination value. In other words, the other machine 26o recognizes the priority/subordination among the other machine 26o and the host machine 26e by comparing the state information concerning the other machine 26o and the state information concerning the host machine 26e.

In this way, the priority/subordination among the host machine 26e and the other machine 26o can be determined based on the prescribed rule. After this, the process moves to step S74 shown in FIG. 3.

In this way, the rule to be used to determine the priority/subordination among the host machine 26e and the other machine 26o may be set in advance.

Here, an example is described of a case in which the first determination value is the state information concerning the host machine 26e, but the present invention is not limited to this. For example, the choice selected by the host machine 26e from among the plurality of choices in the trilemma relationship may be the first determination value. Furthermore, here, an example is described of a case in which the second determination value is the state information concerning the other machine 26o, but the present invention is not limited to this. For example, the choice selected by the other machine 26o from among the plurality of choices in the trilemma relationship may be the second determination value.

Here, an example is described of a case in which the process such as described above is performed in a case where the priority/subordination degree R of the host machine 26e determined by the priority/subordination determining section 64 and the priority/subordination degree R of the other machine 26o determined by the priority/subordination determining section 64 are the same, but the present invention is not limited to this. For example, the process such as described above may be performed in a configuration where the priority/subordination degree R of the host machine 26e and the priority/subordination degree R of the other machine 26o are not determined by the priority/subordination determining section 64.

Figure 9:
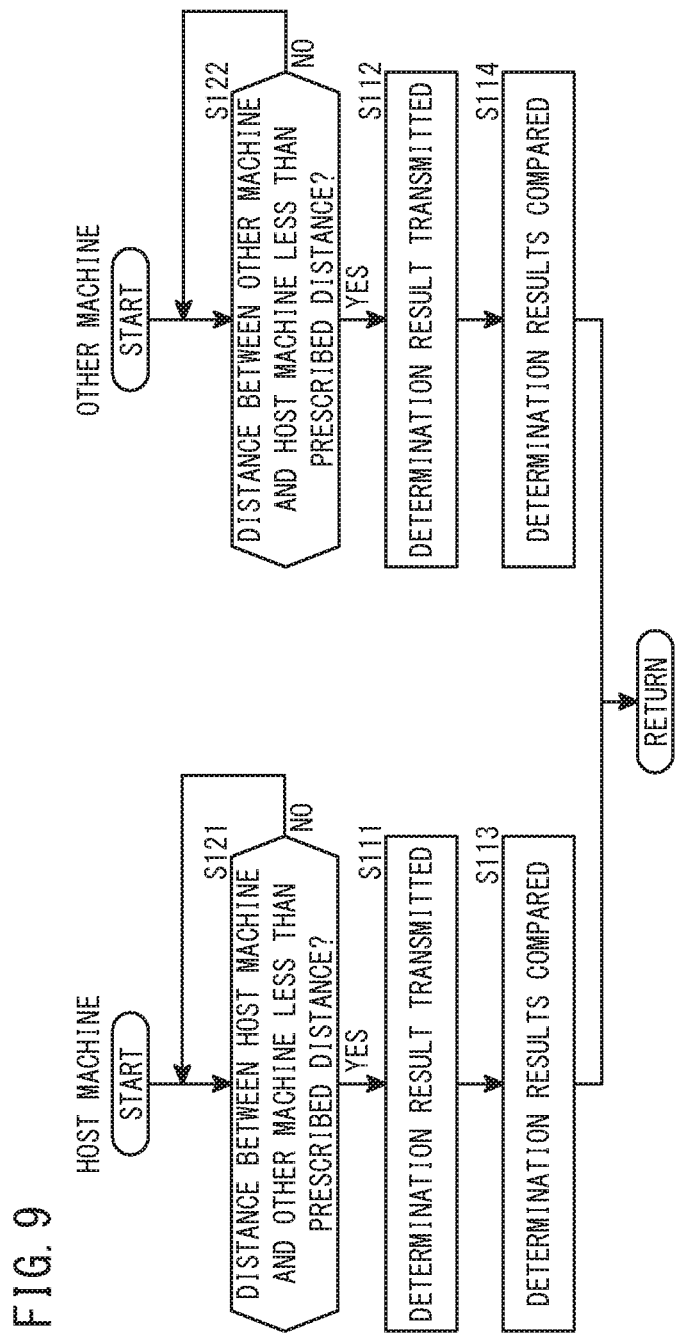
FIG. 9 is a flow chart showing an example of an operation in a case where the priority/subordination degrees are the same.

In the example shown in FIG. 8, an example is described of a case in which the transmission/reception of the timing signal (step S103) is performed, but the present invention is no limited to this. When the distance between the host machine 26e and the other machine 26o has become less than a prescribed distance, the state information indicating the state of the drone 26 may be transmitted. FIG. 9 is a flow chart showing an example of an operation in a case where the priority/subordination degrees are the same. FIG. 9 shows an example of a case in which the state information is transmitted when the distance between the host machine 26e and the other machine 26o has become less than the prescribed distance. In other words, in the example shown in FIG. 9, the state information of the host machine 26e is set to be the first determination value and the state information of the other machine 26o is set to be the second determination value. Here, an example is described of a case in which the state information is transmitted when the distance between the host machine 26e and the other machine 26o is less than the prescribed distance, but the present invention is not limited to this. The individual information, which is not the state information, may be transmitted when the distance between the host machine 26e and the other machine 26o is less than the prescribed distance. The process shown in FIG. 9 can be performed in a case where, at step S73 of FIG. 3, the priority/subordination degree R of the host machine 26e and the priority/subordination degree R of the other machine 26o are the same, for example.

As shown in FIG. 9, steps S121 and S122 are performed but steps S101, S102, and S103 are not performed.

At step S121, the host machine 26e judges whether the distance between the host machine 26e and the other machine 26o is less than the prescribed distance. If the distance between the host machine 26e and the other machine 26o is greater than or equal to the prescribed distance (NO at step S121), step S121 is repeated. If the distance between the host machine 26e and the other machine 26o is less than the prescribed distance (YES at S121), the process moves to step S111.

At step S122, the other machine 26o judges whether the distance between the other machine 26o and the host machine 26e is less than the prescribed distance. If the distance between the other machine 26o and the host machine 26e is greater than or equal to the prescribed distance (NO at step S122), step S122 is repeated. If the distance between the other machine 26o and the host machine 26e is less than the prescribed distance (YES at step S122), the process moves to step S112.

Steps S111 to S114 are the same as steps S111 to S114 described above using FIG. 8, and therefore descriptions thereof are omitted.

In this way, the priority/subordination among the host machine 26e and the other machine 26o can be determined based on the prescribed rule. After this, the process moves to step S74 shown in FIG. 3.

In this way, the state information indicating the state of the drone 26 may be transmitted when the distance between the host machine 26e and the other machine 26o has become less than the prescribed distance.

Here, an example is described of a case in which the first determination value is the state information concerning the host machine 26e, but the present invention is not limited to this. For example, the choice selected by the host machine 26e from among the plurality of choices in the trilemma relationship may be the first determination value. Furthermore, here, an example is described of a case in which the second determination value is the state information concerning the other machine 26o. For example, the choice selected by the other machine 26o from among the plurality of choices in the trilemma relationship may be the second determination value.

Here, an example is described of a case in which the process such as described above is performed in a case where the priority/subordination degree R of the host machine 26e determined by the priority/subordination determining section 64 and the priority/subordination degree R of the other machine 26o determined by the priority/subordination determining section 64 are the same, but the present invention is not limited to this. For example, the process such as described above may be performed in a configuration where the priority/subordination degree R of the host machine 26e and the priority/subordination degree R of the other machine 26o are not determined by the priority/subordination determining section 64.

Figure 10:
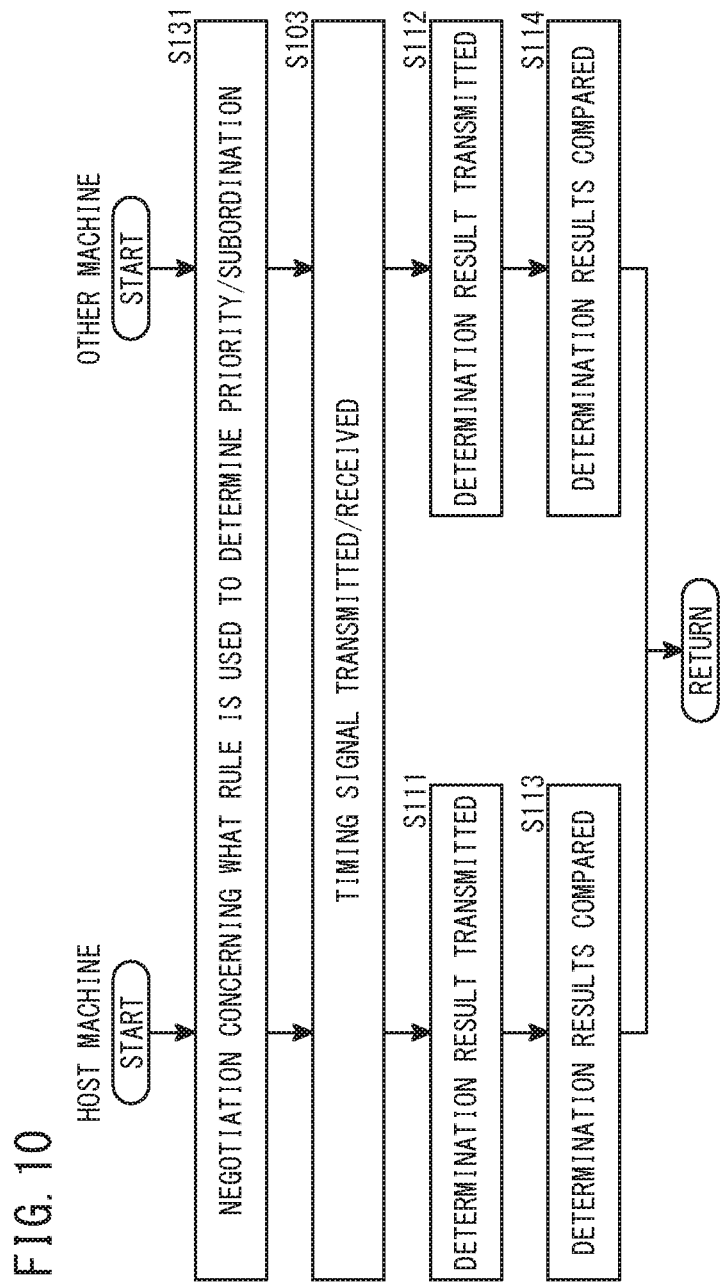
FIG. 10 is a flow chart showing an example of an operation in a case where the priority/subordination degrees are the same.

In the example shown in FIG. 6, an example is described of a case in which the transmission of the request signal (step S101) and the transmission of the acknowledgement signal (step S102) are performed, but the present invention is not limited to this. The negotiation concerning what rule is to be used to determine the priority/subordination may be performed between the host machine 26e and the other machine 26o, without performing the transmission of the request signal (step S101) and the transmission of the acknowledgement signal (step S102). FIG. 10 is a flow chart showing an example of an operation in a case where the priority/subordination degrees are the same. FIG. 10 shows an example of a case in which the negotiation concerning what rule to use to determine the priority/subordination is performed. FIG. 10 shows an example of a case in which the priority/subordination is determined based on the state information, but the present invention is not limited to this. The process shown in FIG. 10 can be performed in a case where, at step S73 of FIG. 3, the priority/subordination degree R of the host machine 26e and the priority/subordination degree R of the other machine 26o are the same, for example.

At step S131, the negotiation concerning what rule is to be used to determine the priority/subordination is performed between the host machine 26e and the other machine 26o. After this, the process moves to step S103.

Step S103 is the same as step S103 described above using FIG. 6, and therefore a description thereof is omitted. After this, the process moves to steps S111 and S112.

Steps S111 to S114 are the same as steps S111 to S114 described above using FIG. 8, and therefore a description thereof is omitted.

In this way, the priority/subordination among the host machine 26e and the other machine 26o can be determined based on the prescribed rule. After this, the process moves to step S74 shown in FIG. 3.

In this way, the negotiation concerning what rule is to be used to determine the priority/subordination may be performed between the host machine 26e and the other machine 26o, without performing the transmission of the request signal and the transmission of the acknowledgement signal.

Here, an example is described of a case in which the first determination value is the state information concerning the host machine 26e, but the present invention is not limited to this. For example, the choice selected by the host machine 26e from among the plurality of choices in the trilemma relationship may be the first determination value. Furthermore, here, an example is described of a case in which the second determination value is the state information concerning the other machine 26o, but the present invention is not limited to this. For example, the choice selected by the other machine 26o from among the plurality of choices in the trilemma relationship may be the second determination value.

Here, an example is described of a case in which the process such as described above is performed in a case where the priority/subordination degree R of the host machine 26e determined by the priority/subordination determining section 64 and the priority/subordination degree R of the other machine 26o determined by the priority/subordination determining section 64 are the same, but the present invention is not limited to this. For example, the process such as described above may be performed in a configuration where the priority/subordination degree R of the host machine 26e and the priority/subordination degree R of the other machine 26o are not determined by the priority/subordination determining section 64.

Alternatively, at least one of the host machine 26e and the other machine 26o may communicate with the service server 22 and acquire a new priority/subordination degree R to be used temporarily.

In the embodiment described above, a new priority/subordination degree R is provided when a drone 26 performs delivery a plurality of times (S81 of FIG. 3). However, a new priority/subordination degree R may be provided in other situations, for example. As an example, a drone 26 that patrols the sky with the purpose of security surveillance may be provided with a new priority/subordination degree R (and new flight route RTf) in order to deliver an object, for example. In such a case as well, the service server 22 preferably receives a reception confirmation from the drone 26 (S26 of FIG. 2).

Figure 11:
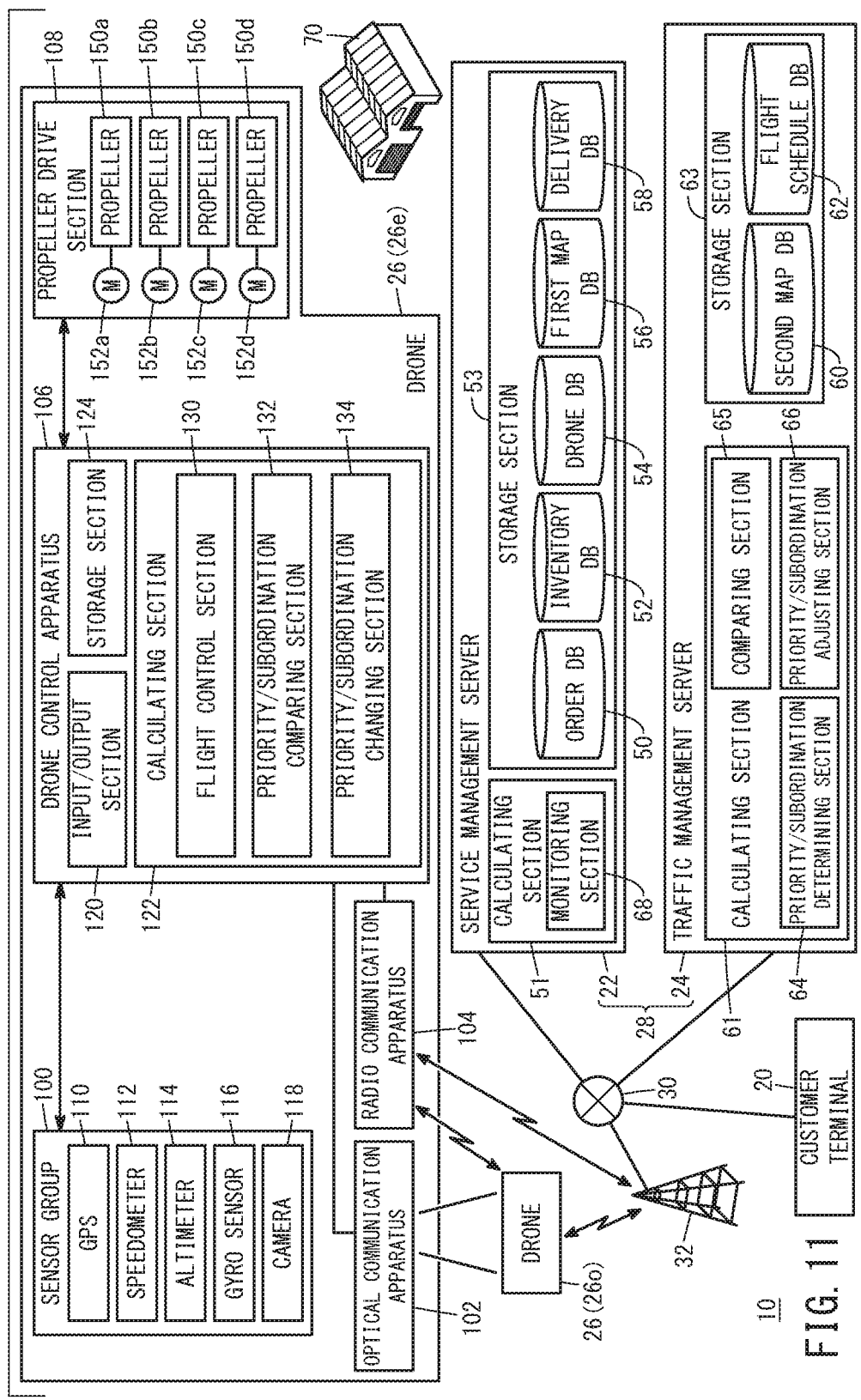
FIG. 11 shows an overall configuration of an example of a case in which a comparing section is included in a movement managing section.

Furthermore, in the embodiment described above, an example is described of a case in which the priority/subordination degree R is transmitted from the movement managing section 28 to the drone 26, but the present invention is not limited to this. For example, the movement managing section 28 may include a comparing section 65 that compares the priority/subordination degrees R determined by the priority/subordination determining section 64. FIG. 11 is an overall configurational view of an example of a case in which the movement managing section includes a comparing section. The comparing section 65 can compare the priority/subordination degree R of the drone 26e and the priority/subordination degree R of the drone 26o. The movement managing section 28 transmits the comparison result acquired by the comparing section 65 to the drones 26. In this way, the comparison result acquired by the comparing section 65 may be transmitted to the drones 26. With such a configuration as well, the mutual behaviors of a plurality of drones 26 can be favorably set.

Figure 12:
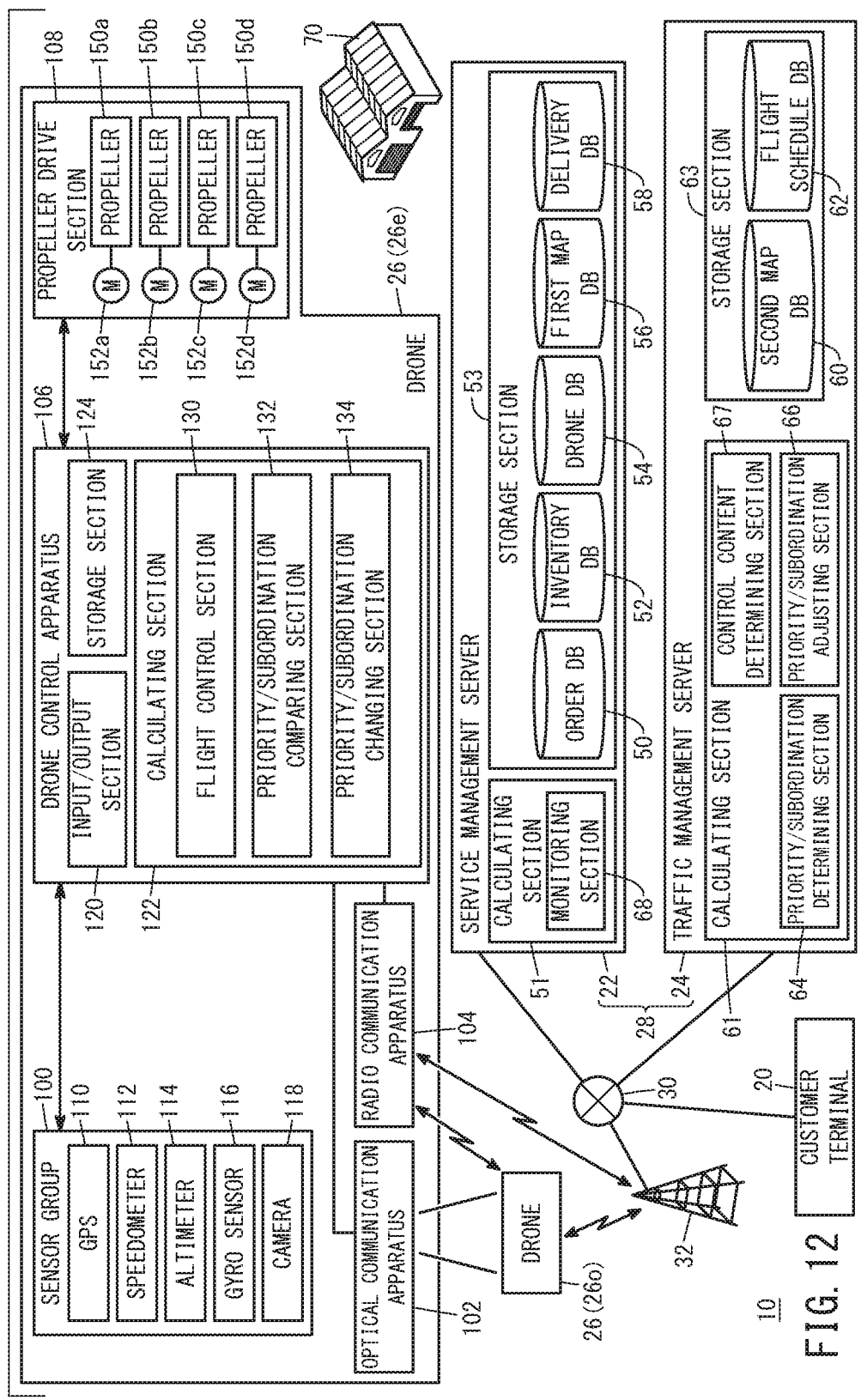
FIG. 12 shows an overall configuration of an example of a case in which a control content determining section is included in the movement managing section.

In the embodiment described above, an example is described of a case in which the priority/subordination degrees R are transmitted from the movement managing section 28 to the drones 26, but the present invention is not limited to this. For example, the movement managing section 28 may include a control content determining section 67 that determines control content based on the priority/subordination degree R determined by the priority/subordination determining section 64. FIG. 12 is an overall configurational view showing an example of a case in which the movement managing section includes a control content determining section. The control content determining section 67 determines the control content based on the priority/subordination degree R of the drone 26e and the priority/subordination degree R of the drone 26o. The movement managing section 28 transmits the control content determined by the control content determining section 67 to the drones 26. In this way, the control content determined by the control content determining section 67 may be transmitted to the drones 26. With such a configuration as well, the mutual behaviors of a plurality of drones 26 can be favorably set.

In the embodiment described above, an example is described of a case in which the host machine 26e and the other machine 26o are both drones, that is, autonomous moving bodies, but the present invention is not limited to this. For example, the other machine 26o may be a non-autonomous moving body with an operator riding therein.

In the embodiment described above, an example is described of a case in which the flight control section 130 broadcasts the priority/subordination degree R, but the present invention is not limited to this. For example, a request signal making a request to the other machine 26o to emit the priority/subordination degree R of the other machine 26o may be transmitted by the host machine 26e to the other machine 26o. Then, the other machine 26o may transmit the priority/subordination degree R to the host machine 26e based on this request signal. A request signal transmitting section for transmitting such a request signal can be realized by at least one of the radio communication apparatus 104 and the optical communication apparatus 102 in the manner described above, for example.

Figure 13:
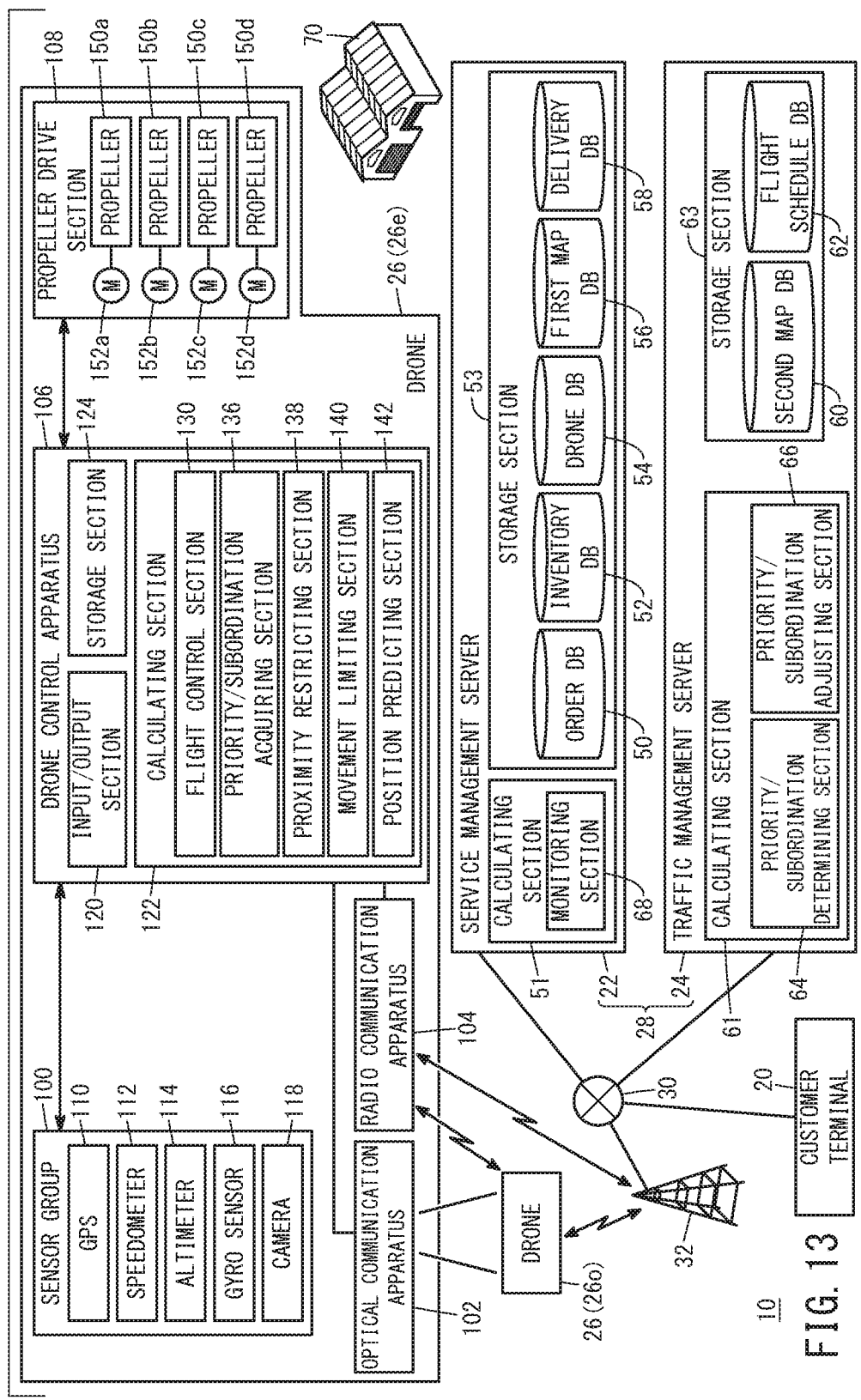
FIG. 13 shows an overall configuration of an outline of a management system according to a modification of the embodiment.

The management system may be configured to perform a process such as described below at step S76 in the embodiment described above. FIG. 13 is an overall configurational view of an outline of the management system according to a modification of the embodiment.

As shown in FIG. 13, the calculating section 122 includes a flight control section 130, a priority/subordination acquiring section 136, a proximity restricting section 138, a movement limiting section 140, and a position predicting section 142. The flight control section 130, the priority/subordination acquiring section 136, the proximity restricting section 138, and the movement limiting section 140 can be realized by performing a program stored in the storage section 124 with the calculating section 122. The priority/subordination comparing section 132, the priority/subordination changing section 134, and the like described above using FIG. 1 may also be included in the calculating section 122. The comparing section 65 described above using FIG. 11 may also be included in the calculating section 61. The control content determining section 67 described above using FIG. 12 may also be included in the calculating section 61.

The priority/subordination acquiring section 136 acquires the priority/subordination relationship concerning movement among the host machine 26e and the other machine 26o. The priority/subordination relationship can be the priority/subordination degree R in the embodiment described above, for example, but is not limited to this. The priority/subordination relationship can be determined based on the individual information or the like of the host machine 26e and the other machine 26o. The priority/subordination relationship may be determined by the movement managing section 28, or may be determined between the host machine 26e and the other machine 26o.

The proximity restricting section 138 restricts the host machine 26e from becoming close to the current position of the other machine 26o or a future position (future movement route) of the other machine 26o, if the priority/subordination acquiring section 136 has acquired information indicating that the host machine 26e is subordinate to the other machine 26o. Specifically, in such a case, the proximity restricting section 138 controls the flight control section 130 such that the position of the host machine 26e does not become close to the current position of the other machine 26o or the future position of the other machine 26o. Furthermore, in such a case, the proximity restricting section 138 may control the flight control section 130 in a manner to maintain the current position of the host machine 26e. Yet further, in such a case, the proximity restricting section 138 may control the flight control section 130 such that the host machine 26e moves away from the current position of the other machine 26o or the future position of the other machine 26o. Such proximity restriction can be realized at step S76 in the embodiment described above.

Figure 14:
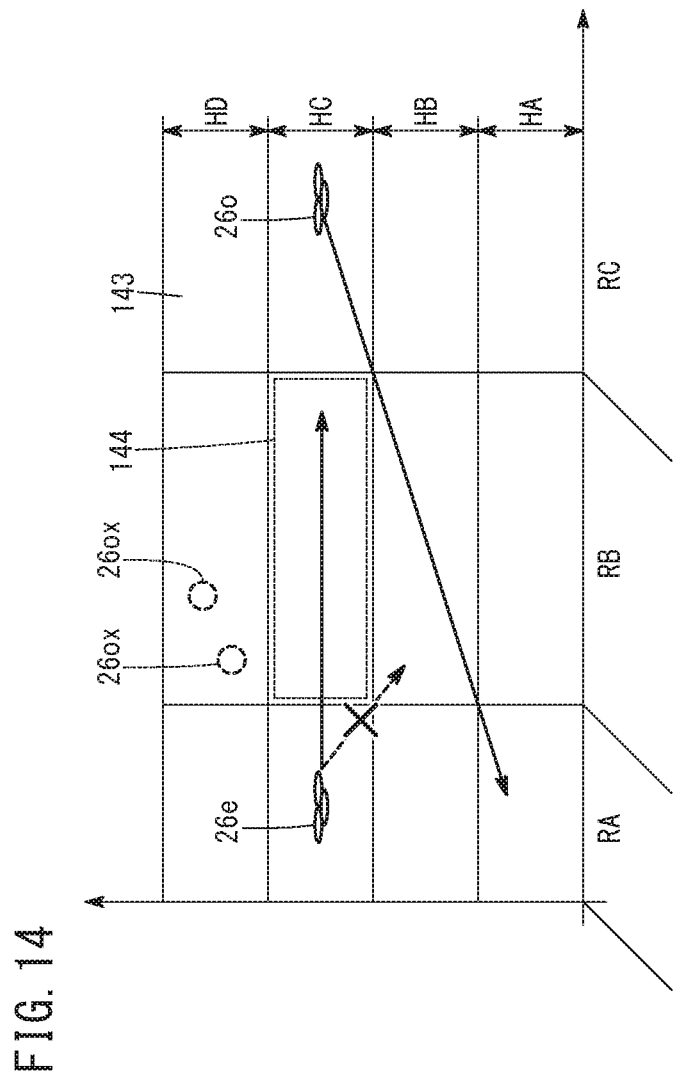
FIG. 14 is a schematic view of an example of a movement space.

If the priority/subordination acquiring section 136 has acquired information indicating that the host machine 26e is subordinate to the other machine 26o, the movement limiting section 140 limits the movement destination of the host machine 26e to be within a movement-possible space 144 (see FIG. 14) selected from among a plurality of divided spaces 143. The movement-possible space 144 is a space whose size in the vertical direction is smaller than the size thereof in the horizontal direction. FIG. 14 shows twelve divided spaces 143 as an example.

The position predicting section 142 can predict a future position of the other machine 26o, based on the current position of the other machine 26o, the current travel direction of the other machine 26o, and the current velocity of the other machine 26o.

FIG. 14 is a schematic view of an example of a movement space. FIG. 14 shows an altitude range HA, an altitude range HB, an altitude range HC, and an altitude range HD, but the present invention is not limited to this. Furthermore, FIG. 14 shows a region RA, a region RB, and a region RC, but the present invention is not limited to this. FIG. 14 shows an example of a case in which the host machine 26e is moving in the sky above the region RA and the altitude of the host machine 26e is within the altitude range HC. Furthermore, FIG. 14 shows an example of a case in which the other machine 26o is moving in the sky above the region RC and the altitude of the other machine 26o is within the altitude range HC. In FIG. 14, the arrow attached to the other machine 26o indicates an example of a prediction for the movement route, i.e. a predicted route, of the other machine 26o. In the example shown in FIG. 14, the other machine 26o is positioned in the sky over the region RC and within the altitude range HC. FIG. 14 shows an example of a case in which the other machine 26o is predicted to move into the sky over the region RB and into the altitude range HB, and to then move into the sky over the region RA and into the altitude range HA. In FIG. 14, the solid-line arrow attached to the host machine 26e indicates an example of a suitable movement route of the host machine 26e. In FIG. 14, the dashed-line arrow attached to the host machine 26e indicates an example of an unsuitable movement route of the host machine 26e. FIG. 14 shows an example of a case in which the movement-possible space 144 is set in the sky above the region RB and within the altitude range HC, but the present invention is not limited to this.

Figure 15A:
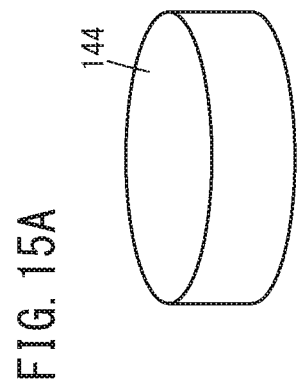
FIGS. 15A, 15B, 15C, and 15D are schematic views of shapes of movement-possible spaces.
Figure 15B:
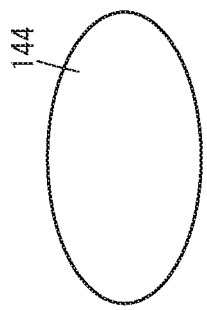
Figure 15C:
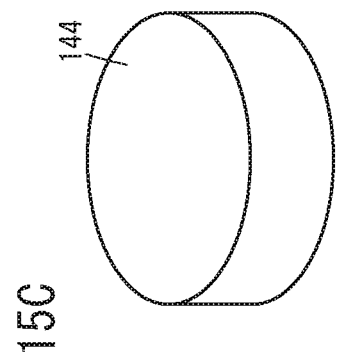
Figure 15D:
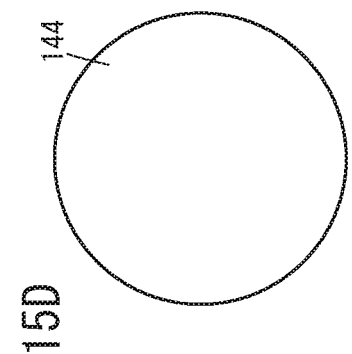

FIGS. 15A to 15D are schematic views of the shapes of movement-possible spaces. FIGS. 15A and 15B show an example of a case in which the shape of the movement-possible space 144 seen in the vertical direction is elliptical. FIG. 15A is a perspective view, and FIG. 15B is a planar view. When such a movement-possible space 144 is set, the longitudinal axis of the elliptical shape forming the top plane of this movement-possible space 144 can be set to match a horizontal component within the travel direction of the drone 26. FIGS. 15C and 15D show an example of a case in which the shape of the movement-possible space 144 seen in the vertical direction is circular. FIG. 15C is a perspective view, and FIG. 15D is a planar view.

In a case where information indicating that the other machine 26o has priority over the host machine 26e is acquired by the priority/subordination acquiring section 136 and the future position of the other machine 26o is in the sky over the region RB and within the altitude range HB, the proximity restricting section 138 controls the flight control section 130 in the manner described below. Essentially, in such a case, the proximity restricting section 138 controls the flight control section 130 in a manner to restrict the host machine 26e from moving close to the future position of the other machine 26o. For example, the proximity restricting section 138 controls the flight control section 130 such that the drone 26e does not move too close to the future position of the other machine 26o. As described above, here, an example is shown of a case in which the movement-possible space 144 is set in the sky above the region RB and within the altitude range HC. If the movement-possible space 144 were to be set in the sky above the region RB and within the altitude range HB, the host machine 26e would become too close to the future position of the other machine 26o, and therefore the movement-possible space 144 is not set in this range.

The above describes an example of a case in which the movement-possible space 144 of the host machine 26e is set in the sky above the region RB and within the altitude range HC, but the present invention is not limited to this. The proximity restricting section 138 may control the movement direction of the host machine 26e such that the vertical direction component in the movement direction of the other machine 26o and the vertical direction component in the movement direction of the host machine 26e are opposite each other. For example, the proximity restricting section 138 may set the movement-possible space 144 in the sky above the region RB and within the altitude range HD. If the movement-possible space 144 is set in this way, the host machine 26e and the other machine 26o can be sufficiently distanced from each other, and therefore the safety can be improved.

In a case where there are a plurality of other machines 26ox in the sky above the region RB and within the altitude range HD, the proximity restricting section 138 does not set the movement-possible space 144 within this space even if these other machines 26ox are subordinate to the host machine 26e. This is because, if the host machine 26e were to enter into the space where the plurality of other machines 26ox are present, it would not be easy to reliably ensure the safety. In this way, if there are a plurality of other machines 26ox, the proximity restricting section 138 restricts the host machine 26e from moving near the current positions of the other machines 26ox or the future positions of the other machines 26ox.

The proximity restricting section 138 may set the movement-possible space 144 to be in the sky over the region RA and within the altitude range HD. In this way, if the movement-possible space 144 is set such that the host machine 26e is distanced from the current position of the other machine 26o or the future position of the other machine 26o, it is possible to further improve the safety.

According to the configuration such as described above, the host machine 26e and the other machine 26o can avoid becoming close to each other, and therefore the safety can be improved.

REFERENCE SIGNS LIST

10: management system
26: drone (autonomous moving body, moving body)
26e: host machine
26o: other machine
28: movement managing section
61: calculating section
63: storage section
64: priority/subordination determining section
66: priority/subordination adjusting section
68: monitoring section
102: optical communication apparatus
104: radio communication apparatus (priority/subordination receiving section)
130: flight control section (autonomous control section)
132: priority/subordination comparing section
134: priority/subordination changing section

The invention claimed is:

1. A management system comprising a movement managing section that communicates via a communication apparatus with a plurality of moving bodies including an autonomous moving body having an autonomous control section configured to perform autonomous movement and manages movement of the plurality of moving bodies, the autonomous moving body being an autonomous moving flying body, an autonomous moving ship, or an autonomous moving automobile,
wherein the movement managing section includes a priority/subordination determining section configured to determine a priority/subordination degree relating to the movement of each of the plurality of moving bodies, based on individual information of the plurality of moving bodies, and
the autonomous moving body includes a priority/subordination comparing section configured to make a comparison between another priority/subordination degree, which is the priority/subordination degree determined by the priority/subordination determining section for another moving body that is different from the autonomous moving body among the plurality of moving bodies, and a self priority/subordination degree, which is the priority/subordination degree determined by the priority/subordination determining section for the autonomous moving body, or a priority/subordination receiving section configured to receive a comparison result between the other priority/subordination degree and the self priority/subordination degree acquired through a comparison made by the movement managing section,
wherein the autonomous moving body further includes a priority/subordination changing section configured to change the self priority/subordination degree determined by the priority/subordination determining section,
wherein if the self priority/subordination degree that is the priority/subordination degree relating to movement of the autonomous moving body and the other priority/subordination degree that is the priority/subordination degree relating to movement of the another moving body are equal and a timing at which the self priority/subordination degree was determined by the priority/subordination determining section is earlier than a timing at which the other priority/subordination degree was determined by the priority/subordination determining section, the priority/subordination changing section changes the self priority/subordination degree that is the priority/subordination degree relating to movement of the autonomous moving body in a manner to become higher than the other priority/subordination degree that is the priority/subordination degree relating to movement of the another moving body, and wherein if the self priority/subordination degree that is the priority/subordination degree relating to movement of the autonomous moving body is higher than the other priority/subordination degree that is the priority/subordination degree relating to movement of the another moving body, the autonomous moving body is given priority over the another moving body.

2. The management system according to claim 1, wherein the priority/subordination changing section changes the self priority/subordination degree based on presence or lack of a passenger on the autonomous moving body.

3. The management system according to claim 1, wherein the priority/subordination changing section changes the self priority/subordination degree based on a movement velocity of the autonomous moving body.

4. The management system according to claim 1, wherein the priority/subordination changing section changes the self priority/subordination degree based on a movement altitude of the autonomous moving body.

5. The management system according to claim 1, wherein the priority/subordination changing section changes the self priority/subordination degree based on a remaining capacity of a propulsion energy source of the autonomous moving body.

6. The management system according to claim 1, wherein the priority/subordination changing section changes the self priority/subordination degree based on a distance that the autonomous moving body is movable using a propulsion energy source.

7. A management system comprising a movement managing section that communicates via a communication apparatus with a plurality of moving bodies including an autonomous moving body having an autonomous control section configured to perform autonomous movement and manages movement of the plurality of moving bodies, the autonomous moving body being an autonomous moving flying body, an autonomous moving ship, or an autonomous moving automobile,
wherein the movement managing section includes a priority/subordination determining section configured to determine a priority/subordination degree relating to the movement of each of the plurality of moving bodies, based on individual information of the plurality of moving bodies, and
the autonomous moving body includes a priority/subordination comparing section configured to make a comparison between another priority/subordination degree, which is the priority/subordination degree relating to movement of another moving body that is different from the autonomous moving body among the plurality of moving bodies, and a self priority/subordination degree, which is the priority/subordination degree relating to movement of the autonomous moving body, or a priority/subordination receiving section configured to receive a comparison result between the other priority/ subordination degree that is the priority/subordination degree relating to movement of the another moving body and the self priority/subordination degree that is the priority/subordination degree relating to movement of the autonomous moving body, acquired through a comparison made by the movement managing section, wherein the movement managing section further includes a priority/subordination adjusting section configured to make the priority/subordination degree of the plurality of moving bodies different from each other by adjusting the priority/subordination degree when there are a plurality of moving bodies that have equal priority/subordination degrees, wherein if the self priority/subordination degree that is the priority/subordination degree relating to movement of the autonomous moving body is higher than the other priority/subordination degree that is the priority/subordination degree relating to movement of the another moving body, the autonomous moving body is given priority over the another moving body.

8. The management system according to claim 7, wherein when there are a plurality of moving bodies that have equal priority/subordination degrees, the priority/subordination adjusting section adjusts the priority/subordination degree of a moving body for which a timing at which the priority/subordination degree was determined is a first timing to become higher than the priority/subordination degree of a moving body for which a timing at which the priority/subordination degree was determined is a second timing that is later than the first timing.

9. The management system according to claim 7, wherein the autonomous moving body controls the autonomous control section based on the comparison result obtained through the comparison made by the priority/subordination comparing section.

10. The management system according to claim 7, wherein the individual information includes machine information that is determined based on use application of the moving body.

11. The management system according to claim 10, wherein the machine information includes a machine classification, and the use application of a moving body associated with a first machine classification among a plurality of the machine classifications is of a more public nature than the use application of a moving body associated with a second machine classification among the plurality of machine classifications.

12. The management system according to claim 11, wherein the first machine classification is divided into at least an emergency machine classification and a normal machine classification, and
the use application of a moving body associated with the emergency machine classification has a higher degree of urgency than the use application of a moving body associated with the normal machine classification.

13. The management system according to claim 11, wherein the second machine classification is divided into at least a commercial machine classification and a non-commercial machine classification,
a moving body associated with the commercial machine classification is used for a commercial purpose, and
a moving body associated with the non-commercial machine classification is used for a non-commercial purpose.

14. The management system according to claim 11, wherein the priority/subordination determining section determines, for a moving body for which the machine information indicates the first machine classification, a priority/subordination degree that is higher than the priority/subordination degree determined for a moving body for which the machine information indicates the second machine classification.

15. The management system according to claim 7, wherein the individual information includes geographic information determined based on a geographic unit classification into which the moving body is permitted to enter.

16. The management system according to claim 7, wherein the individual information includes passenger information determined based on presence or lack of a passenger on the moving body.

17. The management system according to claim 16, wherein the priority/subordination determining section determines, for a moving body for which the passenger information indicates the presence of a passenger, a priority/subordination degree that is higher than the priority/subordination degree determined for a moving body for which the passenger information indicates that there is no passenger.

18. The management system according to claim 7, wherein the individual information includes loaded object information determined based on a value of a loaded object on the moving body.

19. The management system according to claim 18, wherein the priority/subordination determining section determines, for a moving body for which the loaded object information indicates a first value, a priority/subordination degree that is higher than the priority/subordination degree determined for a moving body for which the loaded object information indicates a second value that is less than the first value.

20. The management system according to claim 7, wherein the individual information includes state information indicating a state of the moving body.

21. The management system according to claim 20, wherein the state information is movement velocity information indicating a movement velocity of the moving body, and
the priority/subordination determining section determines, for a moving body for which the movement velocity information indicates a first movement velocity, a priority/subordination degree that is lower than the priority/subordination degree determined for a moving body for which the movement velocity information indicates a second movement velocity that is less than the first movement velocity.

22. The management system according to claim 20, wherein the state information is movement altitude information indicating a movement altitude of the moving body, and
the priority/subordination determining section determines, for a moving body for which the movement altitude information indicates a first movement altitude, a priority/subordination degree that is lower than the priority/subordination degree determined for a moving body for which the movement altitude information indicates a second movement altitude that is less than the first movement altitude.

23. The management system according to claim 20, wherein the state information is remaining capacity information indicating a remaining capacity of a propulsion energy source of the moving body, and
the priority/subordination determining section determines, for a moving body for which the remaining capacity information indicates a first remaining capacity, a priority/subordination degree that is lower than the priority/subordination degree determined for a moving body for which the remaining capacity information indicates a second remaining capacity that is less than the first remaining capacity.

24. The management system according to claim 20, wherein the state information is movable distance information indicating a distance that the moving body is movable using a propulsion energy source and
the priority/subordination determining section determines, for a moving body for which the movable distance information indicates a first movable distance, a priority/subordination degree that is lower than the priority/subordination degree determined for a moving body for which the movable distance information indicates a second movable distance that is shorter than the first movable distance.

25. The management system according to claim 7, wherein the individual information includes capability information determined based on a capability of the moving body.

26. The management system according to claim 25, wherein the capability information is maximum velocity information determined based on a maximum velocity of the moving body, and
the priority/subordination determining section determines, for a moving body for which the maximum velocity information indicates a first maximum velocity, a priority/subordination degree that is lower than the priority/subordination degree determined for a moving body for which the maximum velocity information indicates a second maximum velocity that is less than the first maximum velocity.

27. The management system according to claim 26, wherein the maximum velocity is a maximum velocity in a vertical direction.

28. The management system according to claim 25, wherein the capability information is maximum output information determined based on a maximum output of a propulsion apparatus included in the moving body, and
the priority/subordination determining section determines, for a moving body for which the maximum output information indicates a first maximum output, a priority/subordination degree that is lower than the priority/subordination degree determined for a moving body for which the maximum output information indicates a second maximum output that is less than the first maximum output.

29. The management system according to claim 7, wherein the autonomous moving body further includes a receiving section configured to receive the priority/subordination degree determined by the priority/subordination determining section and a transmitting section configured to transmit the priority/subordination degree received by the receiving section.

30. The management system according to claim 7, wherein the autonomous moving body further includes a request signal transmitting section configured to transmit a request signal for making a request to the other moving body for transmission of the priority/subordination degree of the other moving body.

31. The management system according to claim 7, wherein the movement managing section further includes a monitoring section configured to check whether the autonomous moving body has received the priority/subordination degree.

32. The management system according to claim 7, wherein when the other priority/subordination degree is higher than the self priority/subordination degree, the autonomous control section of the autonomous moving body sets a movement route of the autonomous moving body in a manner prioritizing the other moving body over the autonomous moving body.

33. The management system according to claim 7, wherein the plurality of moving bodies are configured to broadcast the priority/subordination degrees using optical communication and radio communication.

34. An autonomous moving body having an autonomous control section configured to perform autonomous movement,
wherein the autonomous moving body communicates via a communication apparatus with a management system including a priority/subordination determining section and a movement managing section, the priority/subordination determining section configured to determine a priority/subordination degree relating to movement of each of a plurality of moving bodies including the autonomous moving body, based on individual information of the plurality of moving bodies, the movement managing section managing the movement of the plurality of moving bodies, the autonomous moving body being an autonomous moving flying body, an autonomous moving ship, or an autonomous moving automobile, and
the autonomous moving body includes a priority/subordination comparing section configured to make a comparison between another priority/subordination degree, which is the priority/subordination degree determined by the priority/subordination determining section for another moving body that is different from the autonomous moving body among the plurality of moving bodies, and a self priority/subordination degree, which is the priority/subordination degree determined by the priority/subordination determining section for the autonomous moving body, or a priority/subordination receiving section configured to receive a comparison result between the other priority/subordination degree and the self priority/subordination degree acquired through a comparison made by the movement managing section,
wherein the autonomous moving body includes a priority/subordination changing section configured to change the self priority/subordination degree determined by the priority/subordination determining section,
wherein if the self priority/subordination degree that is the priority/subordination degree relating to movement of the autonomous moving body and the other priority/subordination degree that is the priority/subordination degree relating to movement of the another moving body are equal and a timing at which the self priority/subordination degree was determined by the priority/subordination determining section is earlier than a timing at which the other priority/subordination degree was determined by the priority/subordination determining section, the priority/subordination changing section changes the self priority/subordination degree that is the priority/subordination degree relating to movement of the autonomous moving body in a manner to become higher than the other priority/subordination degree that is the priority/subordination degree relating to movement of the another moving body, and wherein if the self priority/subordination degree that is the priority/subordination degree relating to movement of the autonomous moving body is higher than the other priority/subordination degree that is the priority/subordination degree relating to movement of the another moving body, the autonomous moving body is given priority over the another moving body.

35. A control method of an autonomous moving body, the autonomous moving body having an autonomous control section configured to perform autonomous movement and a communication apparatus, the autonomous moving body communicating via the communication apparatus with a management system including a priority/subordination determining section and a movement managing section, the priority/subordination determining section configured to determine a priority/subordination degree relating to movement of each of a plurality of moving bodies including the autonomous moving body, based on individual information of the plurality of moving bodies, the movement managing section managing the movement of the plurality of moving bodies, the autonomous moving body being an autonomous moving flying body, an autonomous moving ship, or an autonomous moving automobile, the method comprising:

a step of making a comparison between another priority/subordination degree, which is the priority/subordination degree determined by the priority/subordination determining section for another moving body that is different from the autonomous moving body among the plurality of moving bodies, and a self priority/subordination degree, which is the priority/subordination degree determined by the priority/subordination determining section for the autonomous moving body, or a step of receiving a comparison result between the other priority/subordination degree and the self priority/subordination degree acquired through a comparison made by the movement managing section; and a step of changing the self priority/subordination degree that is the priority/subordination degree relating to movement of the autonomous moving body in a manner to become higher than the other priority/subordination degree that is the priority/subordination degree relating to movement of the another moving body if the self priority/subordination degree that is the priority/subordination degree relating to movement of the autonomous moving body and the other priority/subordination degree that is the priority/subordination degree relating to movement of the another moving body are equal and a timing at which the self priority/subordination degree was determined by the priority/subordination determining section is earlier than a timing at which the other priority/subordination degree was determined by the priority/subordination determining section, wherein if the self priority/subordination degree that is the priority/subordination degree relating to movement of the autonomous moving body is higher than the other priority/subordination degree that is the priority/subordination degree relating to movement of the another moving body, the autonomous moving body is given priority over the another moving body.

36. A control method of a management system that manages a plurality of moving bodies including an autonomous moving body having an autonomous control section configured to perform autonomous movement, the autonomous moving body being an autonomous moving flying body, an autonomous moving ship, or an autonomous moving automobile, comprising:

a step of determining a priority/subordination degree relating to movement of each of the plurality of moving bodies, based on individual information of the plurality of moving bodies;

a step of making a comparison between another priority/subordination degree, which is the priority/subordination degree relating to movement of another moving body that is different from the autonomous moving body among the plurality of moving bodies, and a self priority/subordination degree, which is the priority/subordination degree relating to movement of the autonomous moving body, or a step of receiving a comparison result between the other priority/subordination degree that is the priority/subordination degree relating to movement of the another moving body and the self priority/subordination degree that is the priority/subordination degree relating to movement of the autonomous moving body; and a step of making the priority/subordination degrees of the plurality of moving bodies different from each other by adjusting the priority/subordination degree when there are a plurality of moving bodies that have equal priority/subordination degrees, wherein if the self priority/subordination degree that is the priority/subordination degree relating to movement of the autonomous moving body is higher than the other priority/subordination degree that is the priority/subordination degree relating to movement of the another moving body, the autonomous moving body is given priority over the another moving body.

37. A management server that communicates via a communication apparatus with a plurality of moving bodies including an autonomous moving body having an autonomous control section configured to perform autonomous movement and manages movement of the plurality of moving bodies, the autonomous moving body being an autonomous moving flying body, an autonomous moving ship, or an autonomous moving automobile, wherein the management server includes a priority/subordination determining section configured to determine a priority/subordination degree relating to the movement of each of the plurality of moving bodies, based on individual information of the plurality of moving bodies, and the autonomous moving body includes a priority/subordination comparing section configured to make a comparison between another priority/subordination degree, which is the priority/subordination degree relating to movement of another moving body that is different from the autonomous moving body among the plurality of moving bodies, and a self priority/subordination degree, which is the priority/subordination degree relating to movement of the autonomous moving body, or a priority/subordination receiving section configured to receive a comparison result between the other priority/subordination degree that is the priority/subordination degree relating to movement of the another moving body and the self priority/subordination degree that is the priority/subordination degree relating to movement of the autonomous moving body, acquired through a comparison made by the management server, and wherein the management server further includes a priority/subordination adjusting section configured to make the priority/subordination degrees of the plurality of moving bodies different from each other by adjusting the priority/subordination degree when there are a plurality of moving bodies that have equal priority/subordination degrees, wherein if the self priority/subordination degree that is the priority/subordination degree relating to movement of the autonomous moving body is higher than the other priority/subordination degree that is the priority/subordination degree relating to movement of the another moving body, the autonomous moving body is given priority over the another moving body.

\* \* \* \* \*